US 6,674,711 B1

(12) United States Patent
Shiba

(10) Patent No.: US 6,674,711 B1
(45) Date of Patent: Jan. 6, 2004

(54) STOCKER AND CHANGER FOR INFORMATION RECORDING MEDIA

(75) Inventor: Katsuhiro Shiba, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 09/499,049

(22) Filed: Feb. 4, 2000

(30) Foreign Application Priority Data

Mar. 1, 1999 (JP) .......................................... P11-053205

(51) Int. Cl.[7] .......................... G11B 17/22; G11B 17/08
(52) U.S. Cl. ................................... 369/178.01; 360/92
(58) Field of Search .......................... 369/178.01, 212, 369/178, 30.42, 30.41, 30.48, 30.53, 30.54, 30.6, 30.67, 30.78, 30.84, 30.85, 30.94, 30.96, 30.69; 360/92

(56) References Cited

U.S. PATENT DOCUMENTS

| | | | | |
|---|---|---|---|---|
| 3,800,313 A | * | 3/1974 | Karklys ........................ 360/69 |
| 4,141,078 A | * | 2/1979 | Bridges, Jr. et al. .......... 369/80 |
| 4,275,425 A | * | 6/1981 | Watanabe et al. ............. 360/92 |
| 5,157,614 A | * | 10/1992 | Kashiwazaki et al. ...... 701/200 |
| 5,233,591 A | * | 8/1993 | Nishihara .................... 369/54 |
| 5,481,514 A | * | 1/1996 | Yamasaki et al. ............. 369/36 |
| 5,532,888 A | * | 7/1996 | Acosta et al. ................. 360/92 |
| 5,590,047 A | * | 12/1996 | Uehara .................. 364/478.02 |
| 5,608,714 A | * | 3/1997 | Shiba et al. ............. 369/30.84 |
| 5,644,445 A | * | 7/1997 | Ishikawa ...................... 360/71 |
| 5,761,530 A | * | 6/1998 | Funahashi et al. ............ 710/15 |
| 5,784,646 A | * | 7/1998 | Sawada ....................... 710/38 |
| 5,848,034 A | * | 12/1998 | Morioka et al. ............. 369/36 |
| 5,870,357 A | * | 2/1999 | Dondero ...................... 369/36 |
| 5,884,298 A | * | 3/1999 | Smith, II et al. ............... 707/2 |
| 5,886,961 A | * | 3/1999 | Yamashita et al. ........ 369/30.3 |
| 5,903,528 A | * | 5/1999 | Yoshimura ................... 369/34 |
| 6,091,696 A | * | 7/2000 | Miyoshi et al. ............. 369/179 |
| 6,236,626 B1 | * | 5/2001 | Nagai .......................... 369/34 |
| 6,256,391 B1 | * | 7/2001 | Ishiguro et al. ............ 380/203 |
| 6,356,971 B1 | * | 3/2002 | Katz et al. .................. 710/301 |

FOREIGN PATENT DOCUMENTS

EP         779620 A2 * 10/1993   ........... G11B/17/22

* cited by examiner

*Primary Examiner*—Allen Cao
(74) *Attorney, Agent, or Firm*—Ladas & Parry

(57) ABSTRACT

A stocker for information recording media is capable of stocking the information recording media and is to be loaded in a changer or unloaded from it. The stocker comprises a trace record device for providing a trace of lodging or dislodging operation of at least one information recording medium when the above-mentioned operation is carried out in an off-line condition.

7 Claims, 37 Drawing Sheets

| UNLOAD END SW | OFF |
|---|---|
| LOAD END SW | OFF |
| UNLOCK SENSE SW | |

| UNLOAD END SW | OFF |
| --- | --- |
| LOAD END SW | ON |

STOCKER AND CHANGER FOR INFORMATION RECORDING MEDIA

BACKGROUND OF THE INVENTION

1. Field of the Invention

The present invention relates to a stocker for information recording media and a changer in which the stocker can be loaded or from which it can be unloaded.

2. Description of the Related Art

According to the conventional stocker for stocking information recording media (for example, discs), it is impossible to recognize whether or not at least one of information recording medium, which is actually stocked in the stocker, is pulled out of the stocker in an off-line condition or at least one new information recording medium is added to the stocker in the off-line condition, by means of a changer, a host computer or the like.

In the description, the term "off-line condition" means a state in which the stocker is not under the control of the changer, the host computer or the like by which the stocker should be controlled (for example, a state in which the stocker is unloaded from the changer, or a state in which the electric power source for the changer is cut off).

When the stocker is loaded again in the changer, it is necessary to make a check on the information recording media and reassemble a database in most cases. As a result, an extremely long period of time is required in order to start a system operation.

SUMMARY OF THE INVENTION

An object of the present invention is therefore to provide a stocker for information recording media, which permits to reduce the required time in order to start a system operation, as well as a changer provided with such a stocker.

In order to attain the aforementioned object, a stocker of the present invention for information recording media, which is capable of stocking the information recording media and is to be loaded in a changer or unloaded therefrom, comprises:

a trace record device for providing a trace of lodging or dislodging operation of at least one information recording medium when said operation is carried out in an off-line condition.

In the above-mentioned stocker of the present invention, there may be adopted a structure that said trace record device can record said trace in interlocking relation with motion of a knob, which determines whether or not said at least one information recording medium can be dislodged from said stocker.

In the above-mentioned stocker of the present invention, there may be adopted a structure that said trace record device has an arm member, which can move in interlocking relation with the motion of said knob, by which said at least one information recording medium can be dislodged from said stocker, so as to record said trace.

A changer of the present invention for information recording media comprises:

a stocker, which is to be loaded in the changer or unloaded therefrom, said stocker being capable of stocking the information recording media and said stocker having a trace record device for providing a trace of lodging or dislodging operation of at least one information recording medium when said operation is carried out in an off-line condition; and a detecting device for detecting said trace.

In the above-mentioned changer of the present invention, there may be adopted a structure that said trace record device can record said trace in interlocking relation with motion of a knob, which determines whether or not said at least one information recording medium can be dislodged from said stocker.

In the above-mentioned changer of the present invention, there may be adopted a structure that said trace record device has an arm member, which can move in interlocking relation with the motion of said knob, by which said at least one information recording medium can be dislodged from said stocker, so as to record said trace; and said detecting device can detect a prescribed state in which said arm member is to be kept.

The above-mentioned changer of the present invention may further comprise a device for erasing said trace when said stocker is unloaded from said changer.

The above-mentioned changer of the present invention may further comprise a loading device for automatically transferring said stocker in an unloading direction in accordance with instructions for unloading said stocker from said changer.

DETAILED DESCRIPTION OF THE PREFERRED EMBODIMENTS

Now, embodiments of a stocker and a changer of the present invention for information recording media will be described in detail below with reference to the accompanying drawings.

Figure 1:
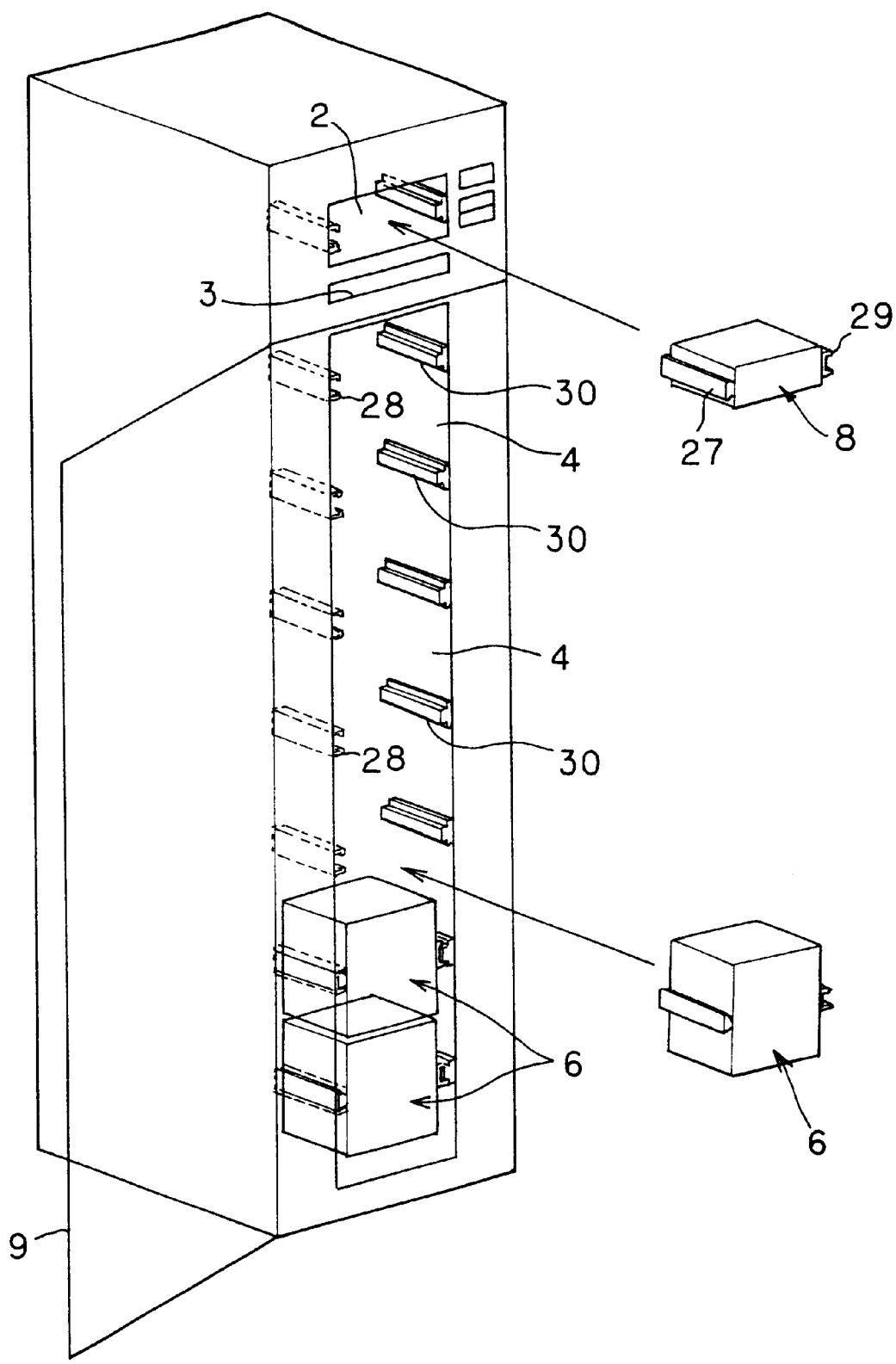
FIG. 1 is a perspective view of a changer of an embodiment of the present invention, as seen from its front side.
Figure 2:
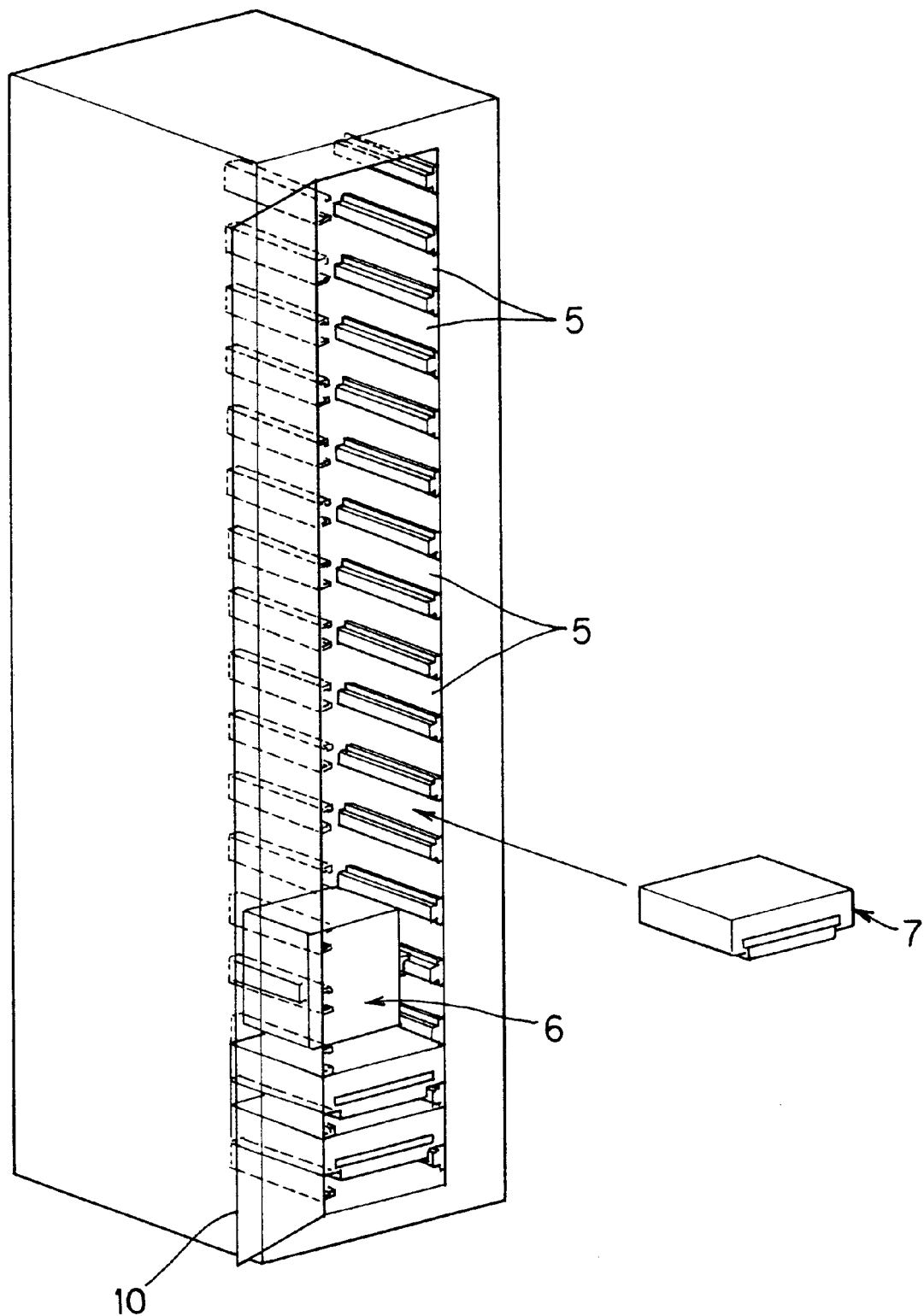
FIG. 2 is a perspective view of the changer as shown in FIG. 1, as seen from its rear side.

As shown in FIGS. 1 and 2, a changer, which can make an automatic exchange of an information recording media, for example, a disc 1 (see FIG. 3), is provided at its front portion with a single slot 2 for a hyper magazine, which is capable of lodging twenty discs, with a single mail slot 3 and with seven slots 4 for disc magazines, each of which is capable of lodging fifty discs. The changer is provided with at its rear portion with common slots 5 for the disc magazines, each of which is capable of lodging fifty discs and disc driving devices for CD-ROM, CD-R, DVD-ROM, DVD-R and the like. Eight stockers 6, i.e., disc magazines, each of which is capable of lodging the fifty discs, can be loaded in the common slots 5 at the maximum on the one hand. The sixteen disc driving devices 7 can be loaded in the common slots 5 at the maximum on the other hand. The stocker 8 serving as the 20 disc-storable hyper magazine and the stocker 6 serving as the 50 disc-storable magazine can be stored (i.e., loaded) in the changer through the slots 2, 4 or pulled out (i.e., unloaded) from them.

The changer is provided in its inside a disc transferring device (not shown). The disc 1 can be moved between the stockers 6, 8, i.e., the disc magazines and the disc driving devices 7 by means of the disc transferring device.

The changer is provided at its front and rear portions with doors 9, 10, respectively, which can be opened only when a power circuit is on. The stocker 8 serving as the 20 disc-storable magazine can be loaded in the slot 2 by means of a motor driving mechanism and a magazine can also be loaded in the mail slot 3 by means of the motor driving mechanism. Accordingly, they can be loaded or unloaded only when the power circuit is on.

In the present invention, each of the stockers 6, 8 serving as the 50 disc-storable magazine and the 20 disc-storable hyper magazine, respectively, has a locking device for preventing the disc 1 from coming off the disc magazine.

There are prepared two kinds of stocker serving as the 50 disc-storable magazine having the locking devices, which are different from each other. One of them is a lock-type disc magazine, in which the lodging or dislodging operation of the disc 1 cannot be carried out outside the changer. The other is a normal-type disc magazine, in which the lodging or dislodging operation of the disc 1 can be carried out outside the changer when the magazine is in an unlocking state.

The stocker 8 serving as the 20 disc-storable hyper magazine is formed into the normal-type disc magazine having the locking device, in which the disc 1 can be lodged or dislodged, and more specifically the disc that is actually stocked in the stocker 8 can be pulled out of it or a new disc can be added into the stocker 8 by turning the locking device into the unlocked state outside the changer.

Each of the stockers 6, 8 is provided with a memory 59. The type, i.e., the lock-type or the normal-type of the disc magazine has been written in the memory 59.

Now, description of the stocker 8 serving as the 20 disc-storable magazine will be given below with reference to FIGS. 3–10.

A housing of the stocker 8 has a rear wall 11 and the opposite side-walls 12 and 13, which locate on three sides. The housing has in its inside a disc rack 14 mounted thereto, which is provided with a plurality of rack grooves 14a. In this embodiment of the present invention, there are formed twenty rack grooves 14a in any one of which the disc 1 can be slidably inserted.

A disc holder 15 corresponding to each of the rack grooves 14a is provided in a space between the one side-wall 12 and the disc rack 14. The disc holder 15 is an integral formed body of synthetic resin, which has a slender piece 15b and an abutting piece 15a formed at the tip end of the abutting piece 15a so as to be capable of coming into contact with the edge of the disc 1. The slender piece 15b of the disc holder 15b is fixed to the disc rack 14. The disc holder 15 comes into contact with a leaf spring 16. The abutting piece 15a of the disc holder 15 comes into contact with the edge of the disc 1 by a resilient force given by the leaf spring 16 so that the disc 1 is supported in the rack groove 14a by the resilient force. When the disc 1 goes in or out of the rack groove 14a by means of the disc transferring device (not shown), the leaf spring 16 and a part of the slender piece 15b are elastically deformed to permit the disc 1 to pass through.

The disc holder 15 is provided with the locking device by which the disc holder 15 can be put in a locking state or an unlocking state. In the locking state, the disc 1 cannot come off the rack groove 14a by inhibiting the deformation of the disc holder 15. In the unlocking state, the disc can come off the rack groove 14a by permitting the deformation of the disc holder 15.

The locking device has a locking member 17 disposed on the inner surface side of the one side-wall 12 and a release knob 18 disposed on the outer surface side of the side-wall 12.

Figure 3:
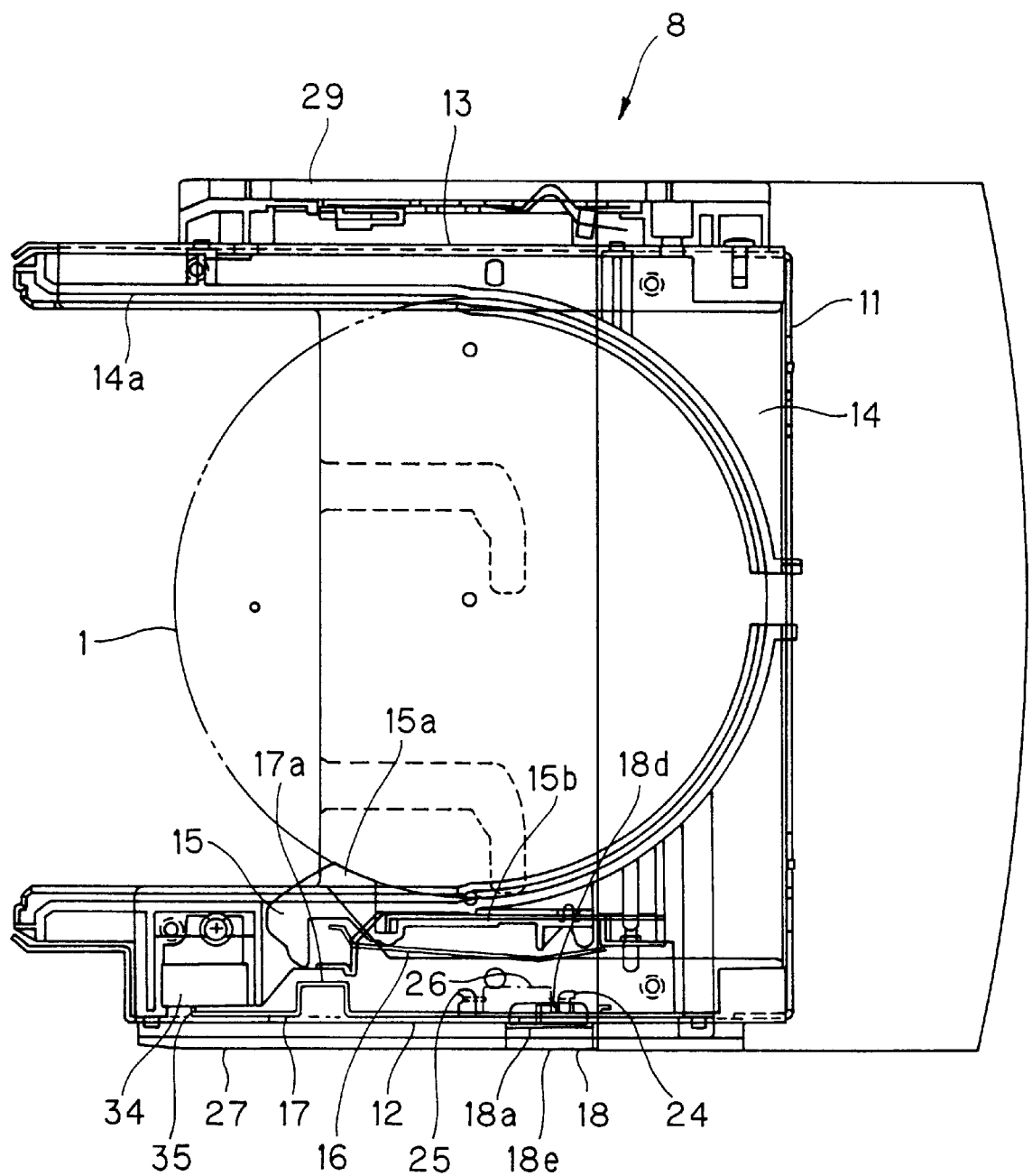
FIG. 3 is a plan view illustrating a stocker, which is kept in the locking state outside the changer.
Figure 4:
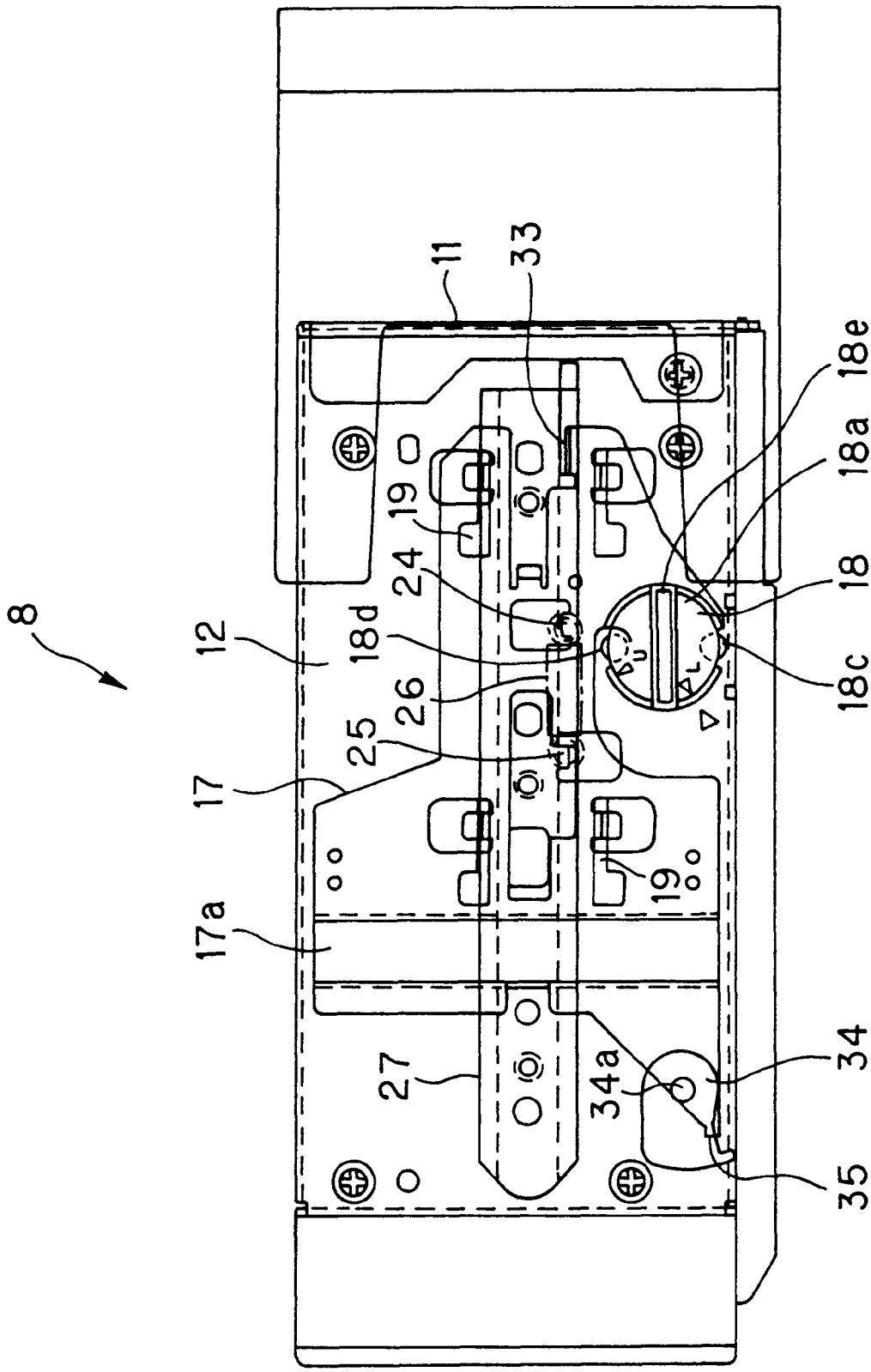
FIG. 4 is a left-hand side view of the stocker as shown in FIG. 3.
Figure 5:
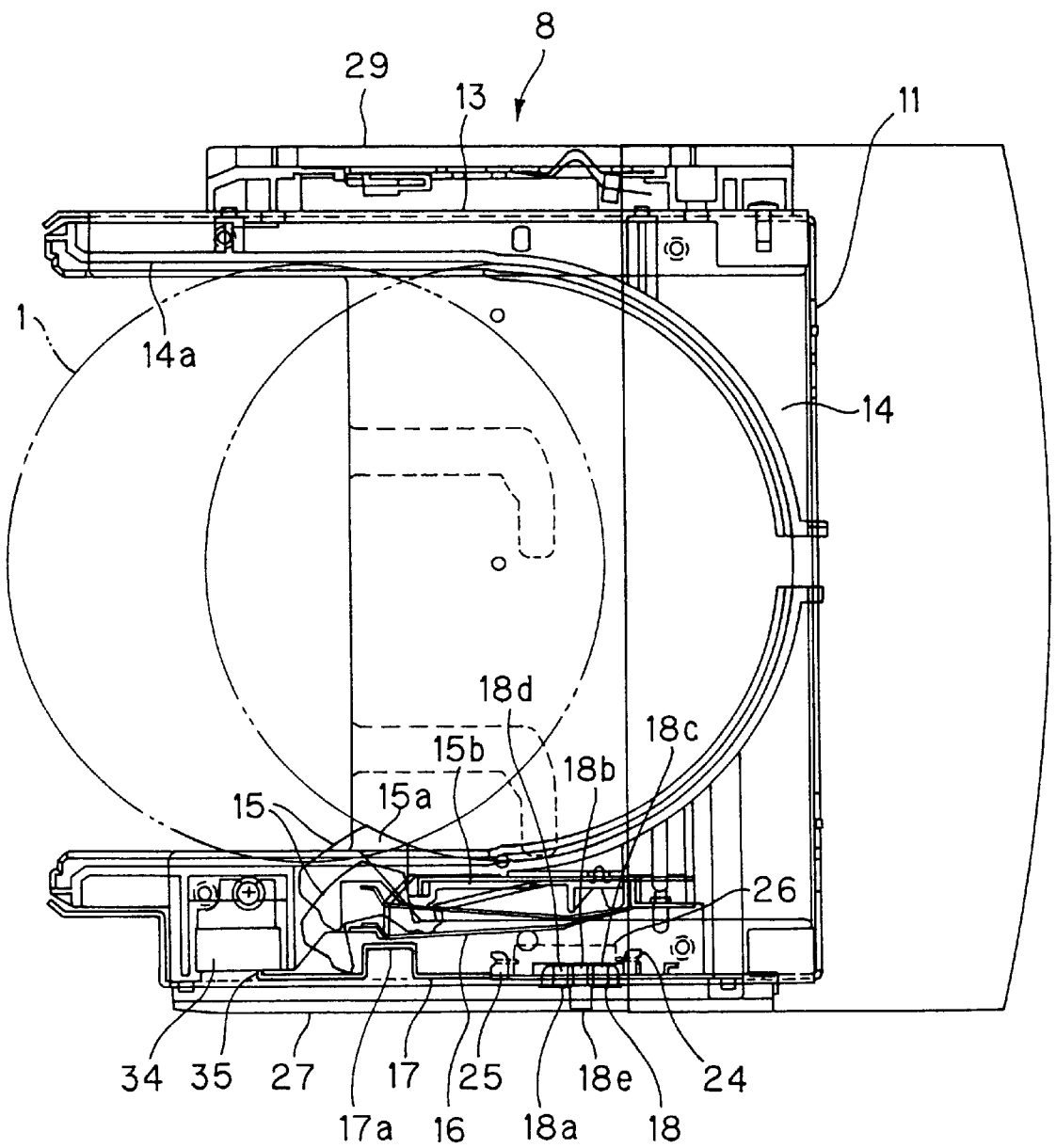
FIG. 5 is a plan view illustrating the stocker, which is kept in the unlocking state outside the changer.
Figure 6:
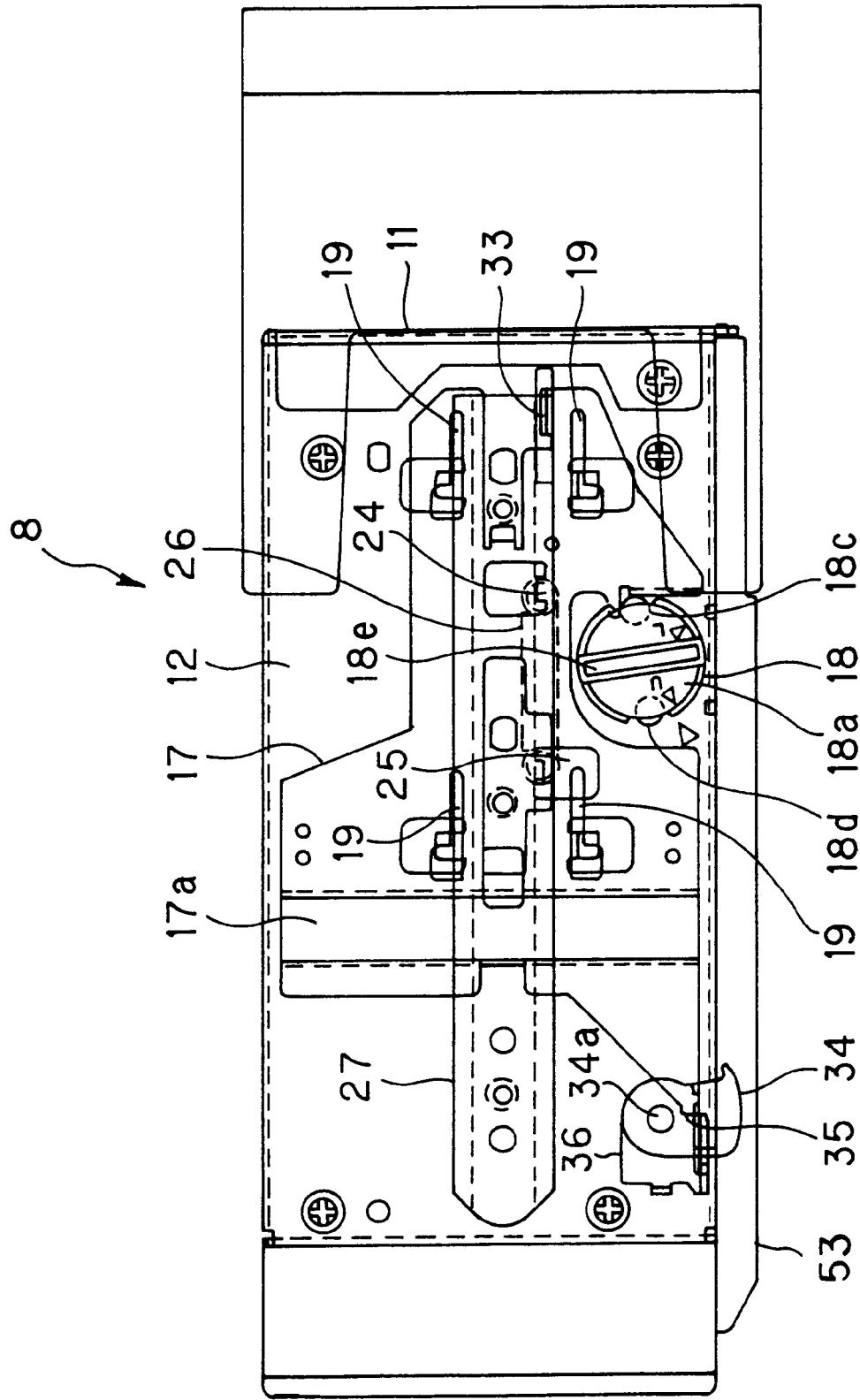
FIG. 6 is a left-hand side view of the stocker as shown in FIG. 5.
Figure 7:
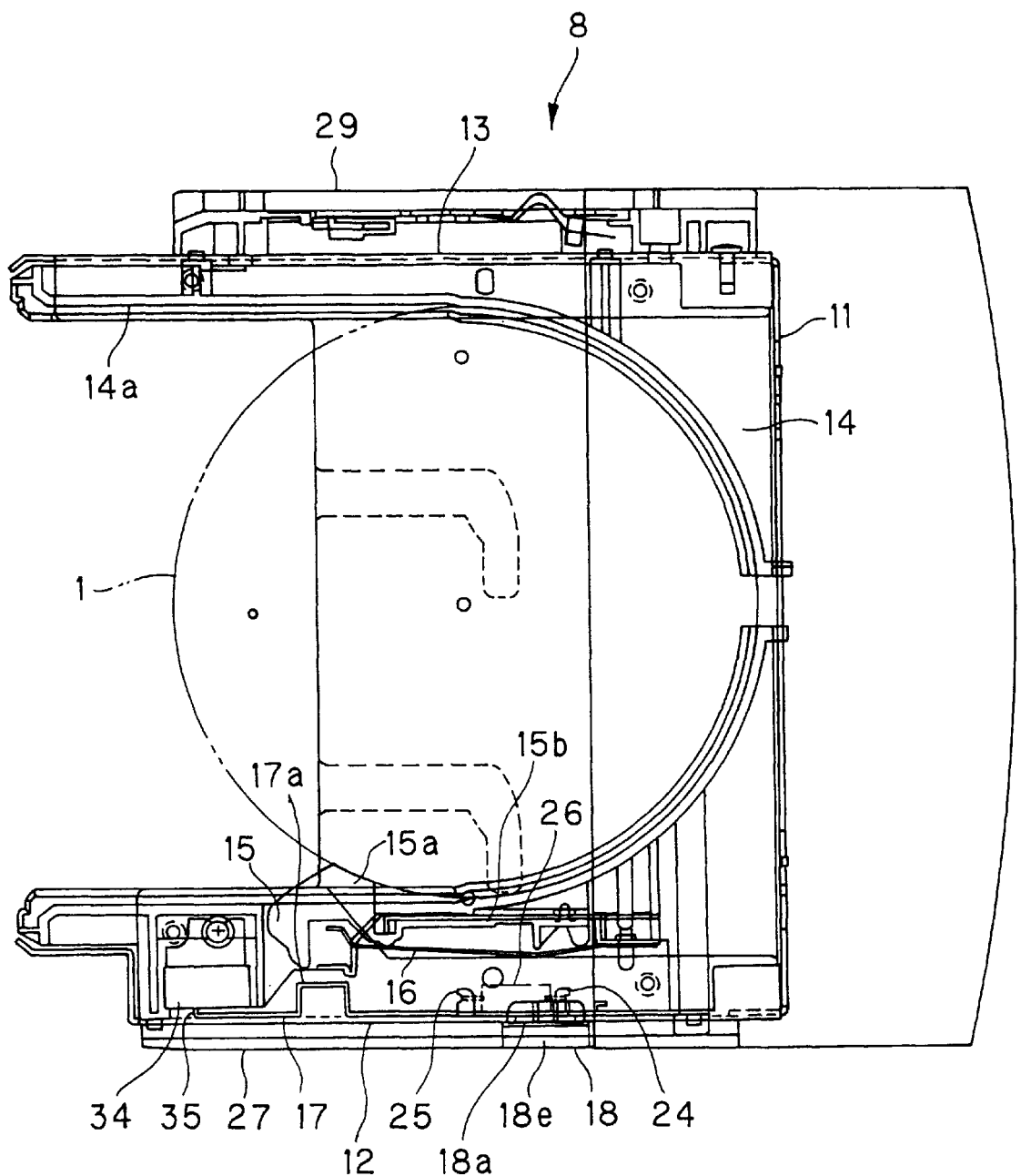
FIG. 7 is a plan view illustrating the stocker, which has been in the unlocking state outside the changer and has then turned into the locking state.
Figure 8:
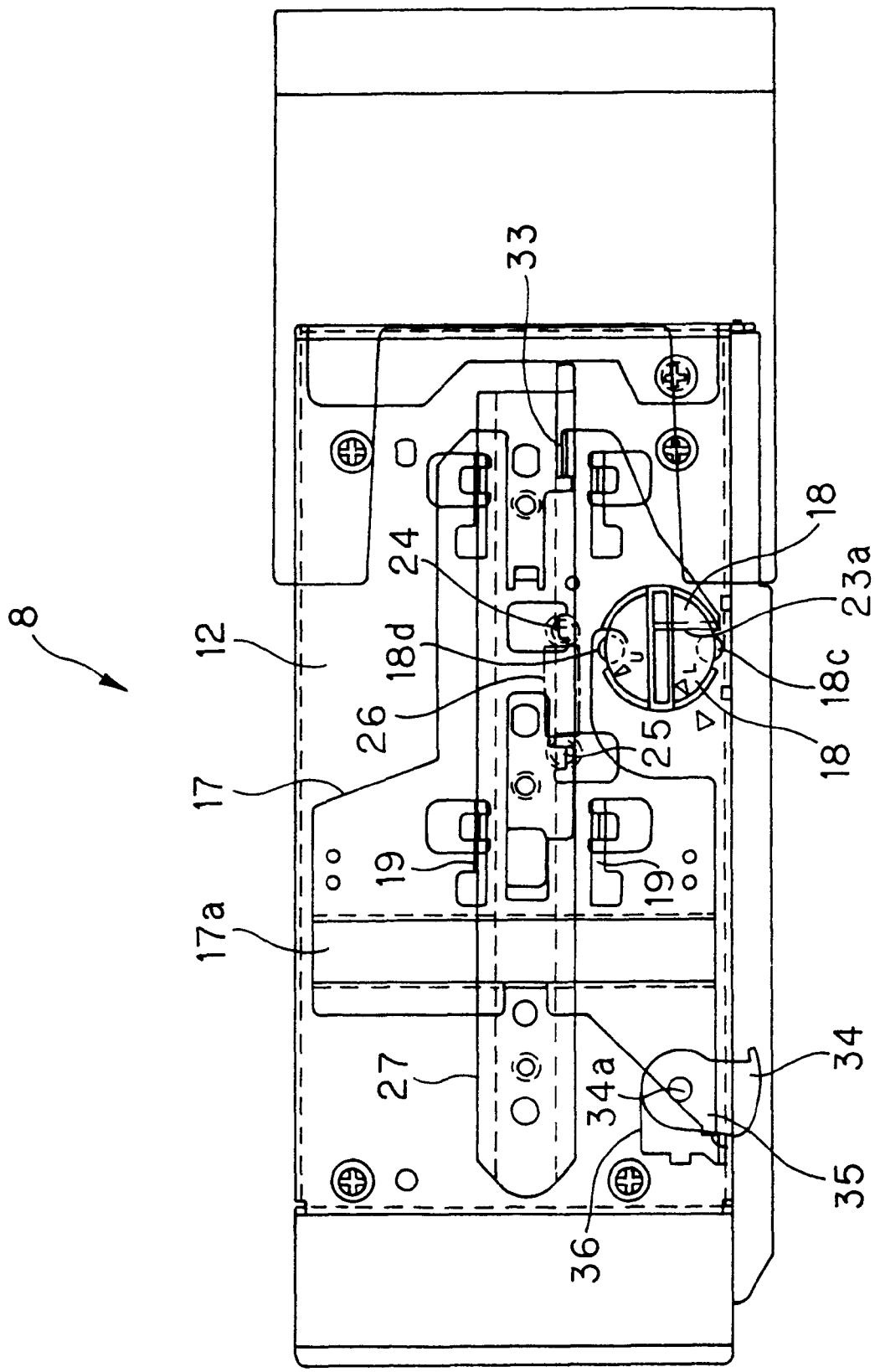
FIG. 8 is a left-hand side view of the stocker as shown in FIG. 7.
Figure 11:
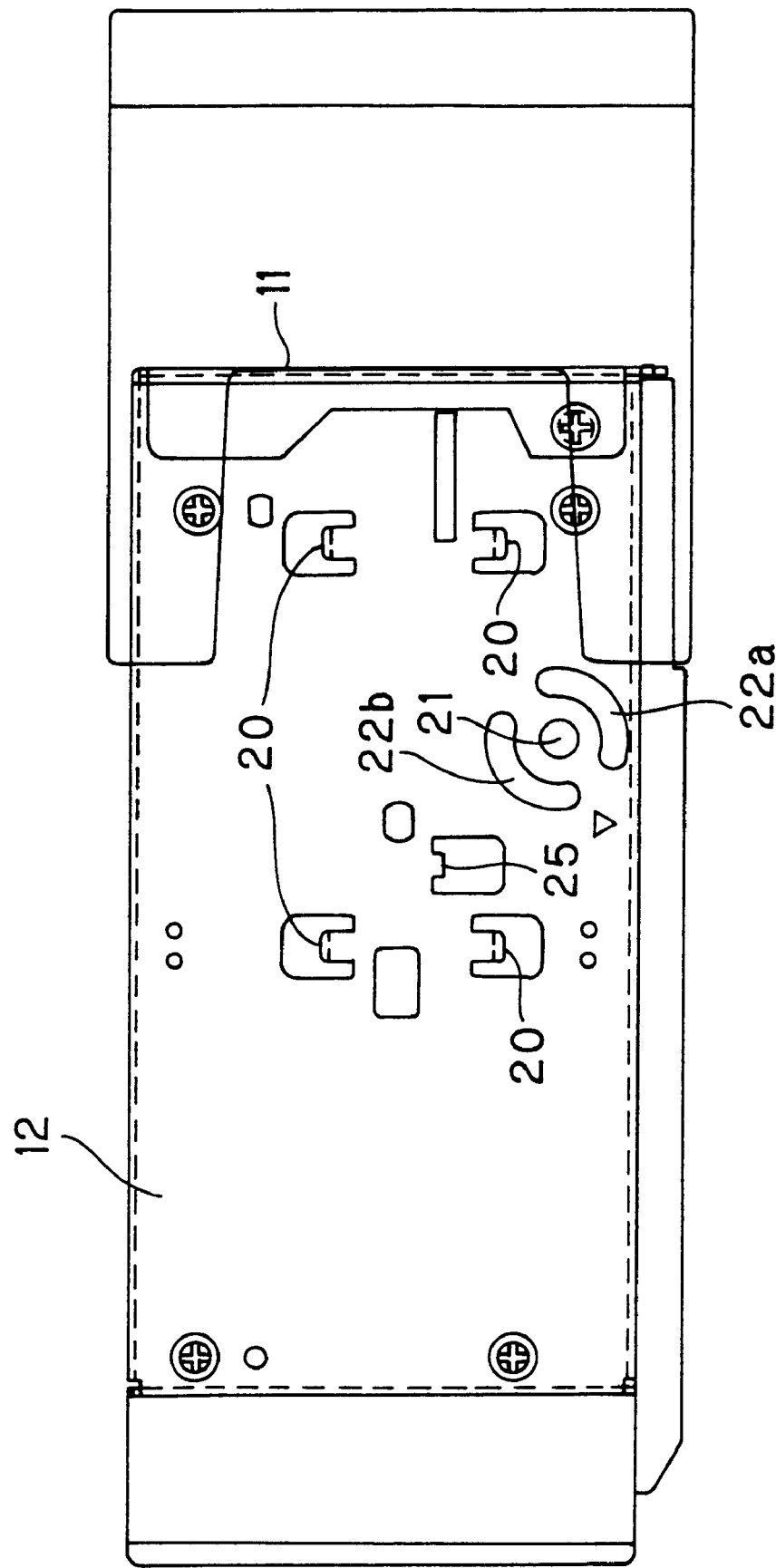
FIG. 11 is a left-hand side view illustrating a side-wall of the housing of the stocker.
Figure 12:
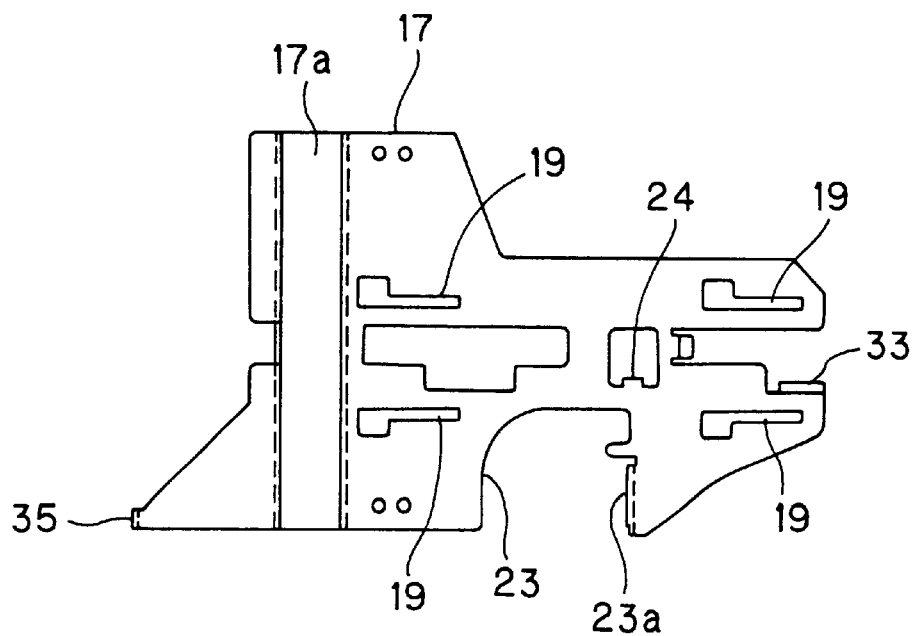
FIG. 12 is a left-hand side view of a locking member.

The locking member 17 is formed of a plate-shaped material as shown in FIG. 12. The locking member 17 has a projection portion 17a, which corresponds to the abutting pieces 15a of all the disc holders 15. The locking member 17 has slits 19 formed thereon so as to extend in the longitudinal direction of the locking member 17. Projections 20 formed on the side-wall 12 as shown in FIG. 11 are inserted into the above-mentioned slits 19. The guidance of the projections 20 by the slits restricts the stroke of the locking member 17 in its sliding motion in the longitudinal direction along the inner surface of the side-wall 12. As a result, the locking member 17 can be put in the locking position as shown in FIGS. 3 and 4 or the unlocking position as shown in FIGS. 5 and 6. When the locking member 17 is put in the locking position, its projection portion 17a locates behind the abutting piece 15a of the disc holder 15 so as to inhibit the disc holder 15 from being deformed. As a result, all the discs 1 cannot come off the disc rack 14 and no disc can be inserted into it. When the locking member 17 is put in the unlocking position, its projection portion 17a locates away from the abutting pieces 15a of the disc holder 15 so as to permit the disc holder 15 to be deformed. As a result, the respective disc 1 can goes in or out of the disc rack 14.

The release knob 18 has a disc-shaped body 18a, which is placed on the side-wall 12 from the outside thereof as shown in FIGS. 3 to 6. A shaft 18b projects from the central portion of the inner surface of the disc-shaped body 18a. Two pins 18c, 18d project from the inner surface of the disc-shaped body 18a so that the above-mentioned shaft 18b locates between the two pins 18c, 18d. The shaft 18b is inserted into a shaft hole 21, which is formed on the side-wall 12, as shown in FIG. 11. The pins 18c, 18d are fitted into two arcuate holes 22a, 22b formed on the portion, respectively, which surrounds the shaft hole 21. The arcuate holes 22a, 22b have a central angle of about 90 degrees and the disc-shaped body 18a can also turn within the range of 90 degrees so that the pins 18c, 18d can locate in any position between the respective ends of the arcuate holes 22a, 22b. One end of each of the arcuate holes 22a, 22b corresponds to the locking position and the other end thereof corresponds to the unlocking position. The disc-shaped body 18a has on its outer surface an elongated projection 18e, a longitudinal direction of which is identical with the horizontal diametric line when the disc-shaped body 18a is in the locking position.

The pins 18c, 18d of the release knob 18 pass through the arcuate holes 22a, 22b of the side-wall 12 toward the locking member 17. The locking member 17 has a cut-out opening 23 including the region in which the pins 18c, 18d of the release knob 18 move in the turning motion of the release knob 18, as shown in FIG. 12. An abutting edge 23a is formed on the edge portion of the locking member 17, which defines the above-mentioned opening 23, so as to correspond to the above-mentioned locking position. The abutting edge 23a can come into contact with the pin 18c. The resilient force give by a spring 26 spreading between an engaging piece 24 of the locking member 17 and an engaging piece 25 formed on the side-wall 12 so as to maintain the locking member 17 in the locking position as shown in FIG. 3 is always applied to the locking member 17. As a result, the release knob 18 can selectively be in the locking position as shown in FIGS. 3 and 4 or the unlocking position as shown in FIGS. 5 and 6 through a switching operation. Tension given by the spring 26 puts the release knob 18 in any one of these positions. Accordingly, the locking member 17 puts the disc holder 15 in the locking or unlocking state.

Figure 13:
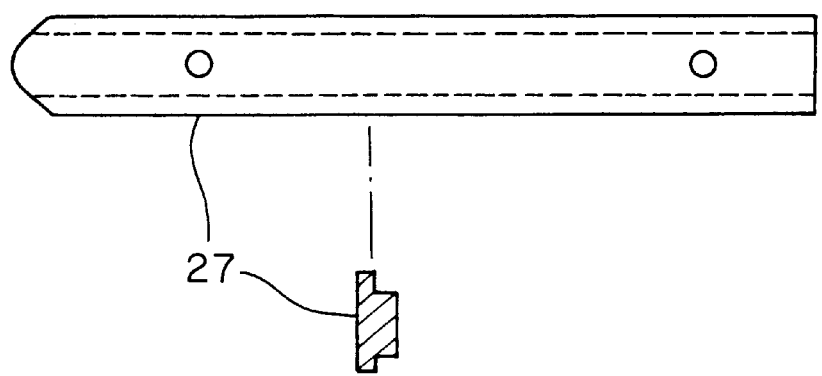
FIG. 13 is a left-hand side view of a slider.
Figure 14:
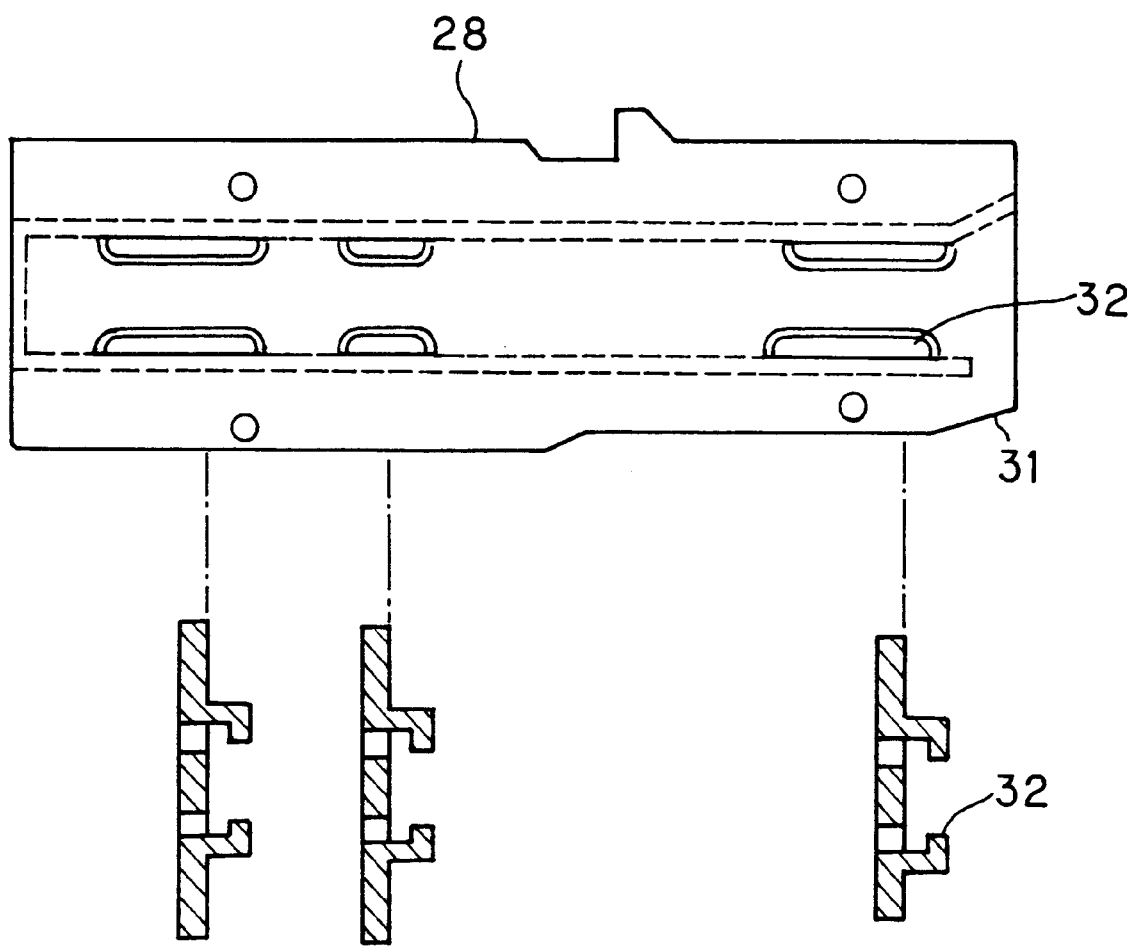
FIG. 14 is a left-hand side view of a guide rail.
Figure 15:
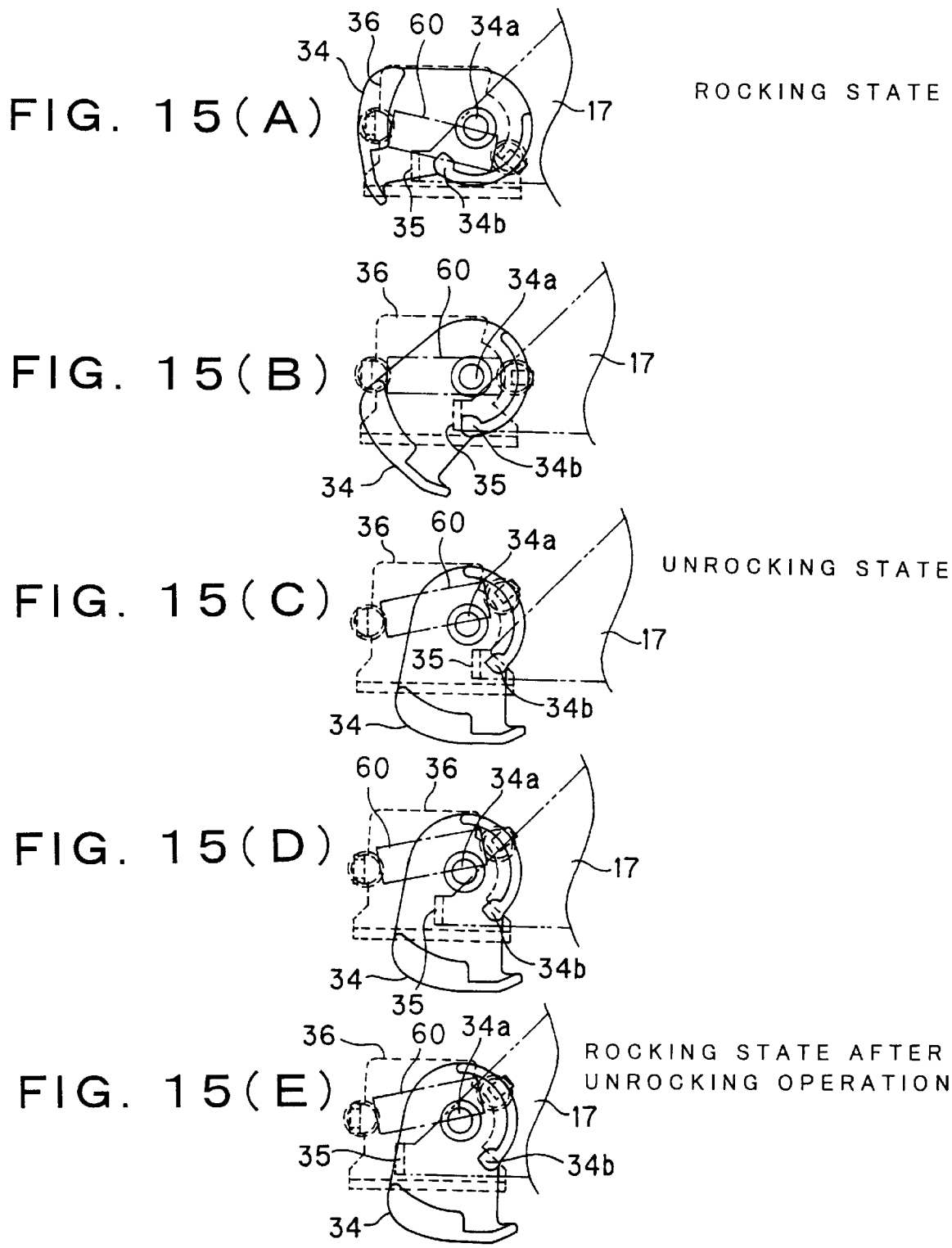
FIGS. 15A to 15E are left-hand side views illustrating motion of a toggle arm.

A slider 27 as shown in FIG. 13 is fixed on the outer surface of the left-hand side-wall 12 of the housing. A guide rail 28 as shown in FIG. 14 is mounted in the inside of the changer, so as to correspond to the above-mentioned slider 27. The other slider 29 is fixed on the outer surface of the right-hand side-wall 13 of the housing. The other guide rail 30 as shown in FIG. 1 is mounted in the inside of the changer, so as to correspond to the above-mentioned other slider 29. According to such a structure, the stocker 8 can be guided by the right and left-hand guide rails 28, 30 so as to be loaded into the changer or unloaded therefrom.

Figure 27:
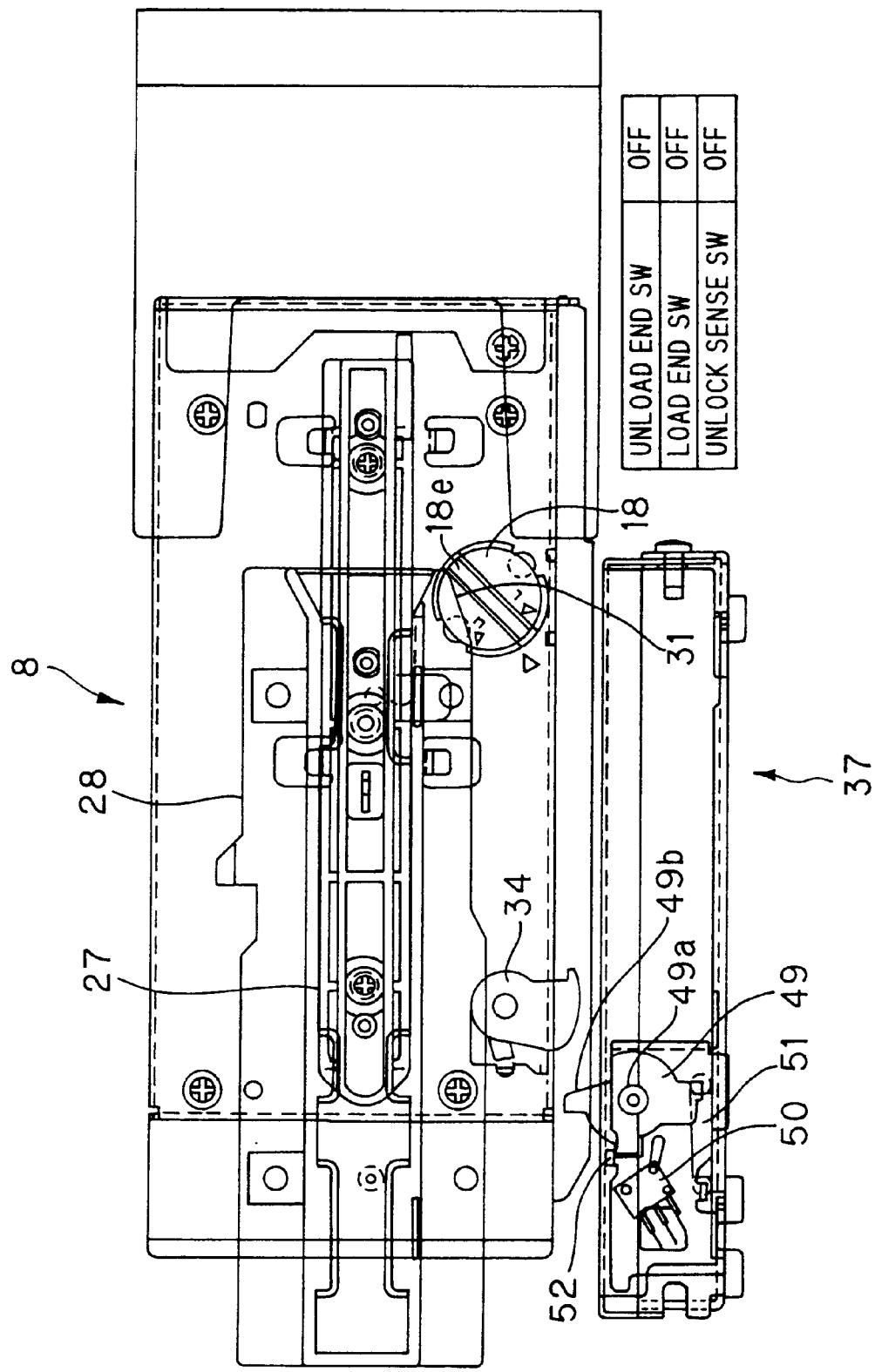
FIG. 27 is a side view illustrating the state in which a release knob is returning to the locking position and the toggle arm comes closer to the detector during the loading operation of the stocker to which the unlocking operation has already been applied.

The guide rail 28 corresponding to the side-wall 12 locating on the release knob 18 side has an inclined cam portion 31 formed thereon as shown in FIGS. 14 and 27, which can come into contact with the elongated projection 18e of the release knob 18, which is in the unlocking state when the stocker 8 is loaded into the changer, so as to return the release knob 18 to the locking position. The release knob 18 that is returned to the locking position by means of the cam portion 31 is put in the locking state even when the stocker 8 is unloaded from the changer. It is however necessary to put the locking device in the unlocking state when the stocker 8 is loaded into the changer. Accordingly, a projection 32 is formed at the end of the guide rail 28, which locates on the inlet side of the changer, and a projecting piece 33 that can strike on the projection 32 from the above-mentioned inlet side is formed on the locking member 17, as shown in FIGS. 9, 10, 12 and 14, so as to permit to separate the locking member 17 from the abutting piece 15a of the disc holder 15 to maintain the unlocking state even when the release knob 18 is put in the locking position.

When the stocker 8 is pulled out of the changer and the release knob 18 is turned so as to put the locking device in the unlocking state, the disc 1 can be lodged in the stocker 8 or dislodged from it. The stocker 8 has a trace record device for providing a trace of operation for pulling the disc 1, which is actually stocked in the stocker 8, out of the stocker or adding a new disc to it, after the stocker 8 is pulled out of the changer.

The trace record device is composed of a toggle arm 34 serving as an arm member and of a projecting piece 35 of a rocking member 17 for operating the toggle arm 34, as shown in FIGS. 3 to 6, and 15.

The toggle arm 34 is disposed in the inside of the side-wall 12 of the housing. The toggle arm 34 is supported through a pivot shaft 34*a* on a bracket 36, which stands to project from the bottom of the housing, so as to be swingable on the vertical plane. When the toggle arm 34 swings downward, it can project below the housing from a hole (not shown) formed on the bottom of the housing. There is adopted a structure in which the toggle arm 34 swung downward locates above the lower edge of the base plate 53 so as not to project below from the above-mentioned lower edge as shown in FIG. 6, thus preventing the toggle arm 34 from easily turning back to the original state.

The toggle arm 34 is connected to the bracket 36 through an acting-direction reversing spring 60 (i.e., a so called "dead-point spring") as shown in FIGS. 15A to 15E The toggle arm 34 swings beyond the change point as shown in FIG. 15(B) to be kept in the one swing-limitation position as shown in FIG. 15(A) or in the other swing-limitation position as shown in FIG. 15(C).

The switching operation of the toggle arm 34 between the opposite swing-limitation positions is caused by the projecting piece 35 of the rocking member 17. The toggle arm 34 has a projection 34*b*, which is formed so as to correspond to the above-mentioned projecting piece 35. In case where no unlocking operation has been applied to the stocker 8, which was pulled out of the changer, and more specifically, there is no possibility that the disc 1 has neither been lodged in the stocker 8 nor been dislodged from it, the rocking member 17 is kept in the locking position. As a result, the toggle arm 34 is kept inside the housing so as not to project below from it (see FIGS. 3, 4, and 15(A)). In case where the unlocking operation has been applied to the stocker 8, which was pulled out of the changer, and more specifically, there is a possibility that the disc 1 has been lodged in the stocker 8 or been dislodged from it, the rocking member 18 turns from the locking position into the unlocking position so that the projecting piece 35 of the locking member 17 comes into contact with the projection 34*b* to swing the toggle arm 34 in the opposite direction. As a result, the toggle arm 34 projects outside from the housing and its projecting state is maintained (see FIGS. 5, 6, 15(B), and 15(C)). If once the toggle arm 34 projects outside from the housing, such a projecting state is maintained irrespective of operation of the release knob 18, which is carried out again outside the changer to keep the locking member 17 in the locking state (see FIGS. 15(D) and 15(E)).

Figure 17:
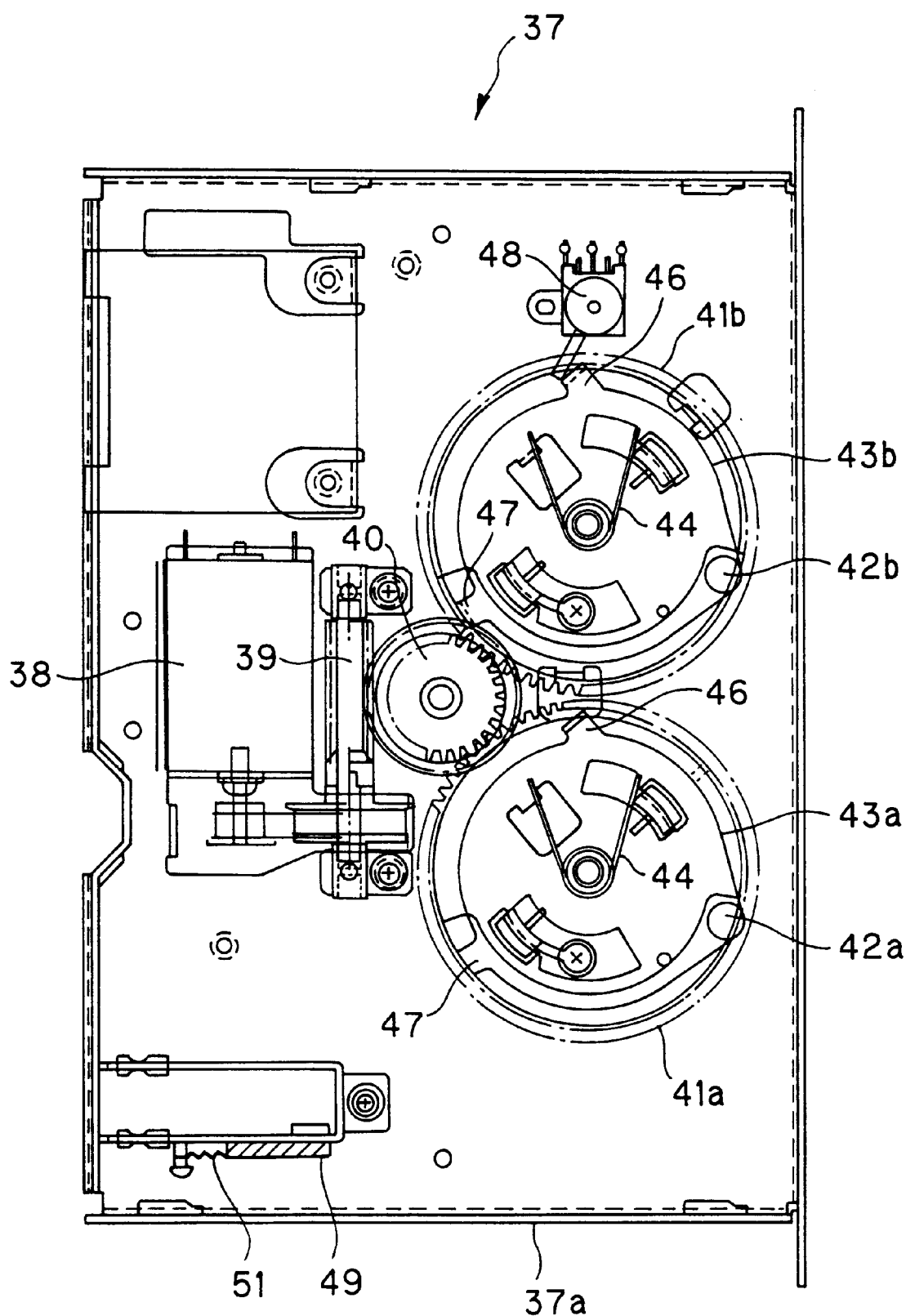
FIG. 17 is a plan view of a loading device.
Figure 21:
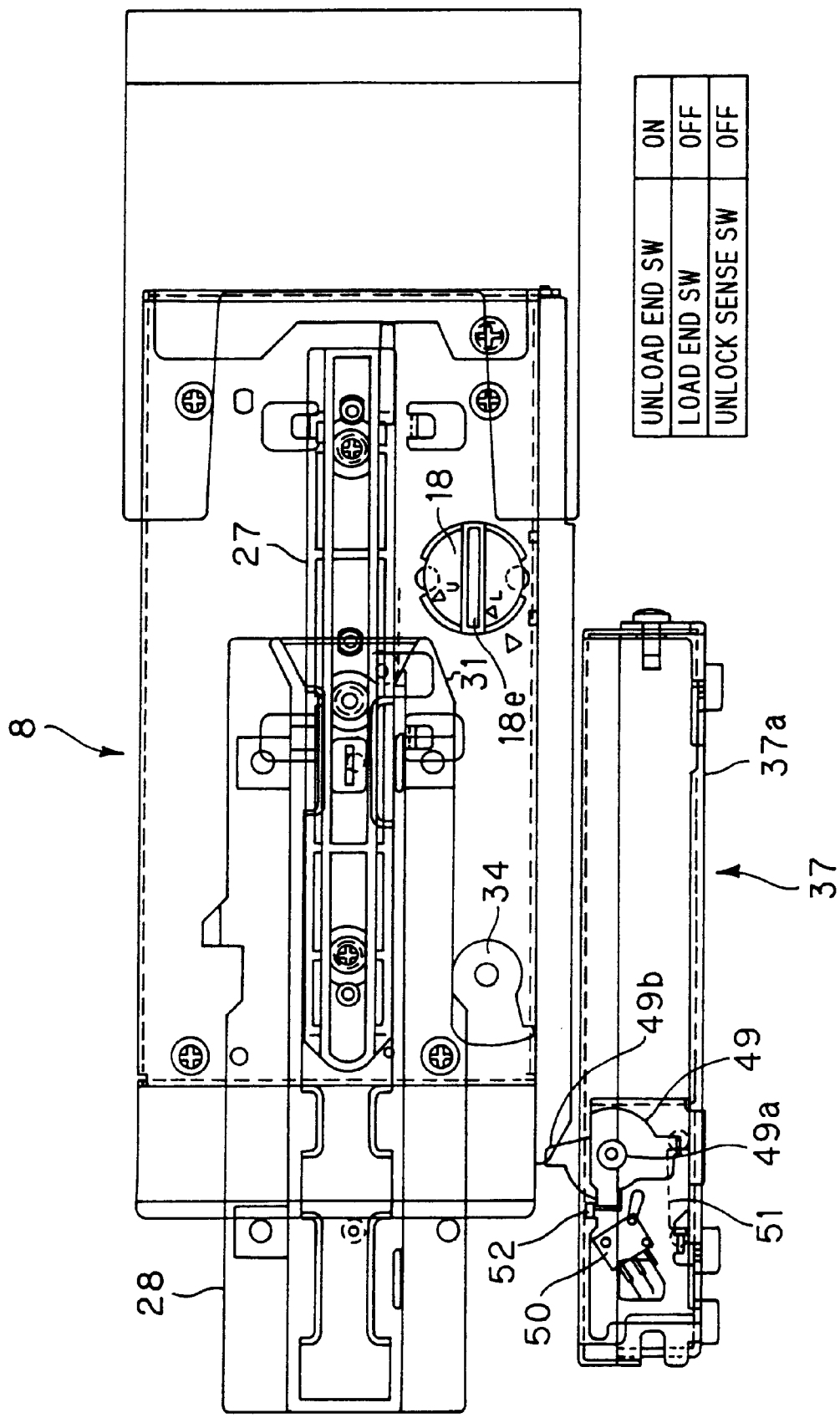
FIG. 21 is a side view illustrating the state in which the toggle arm comes close to a detector during the loading operation of the stocker to which an unlocking operation has not been applied.
Figure 22:
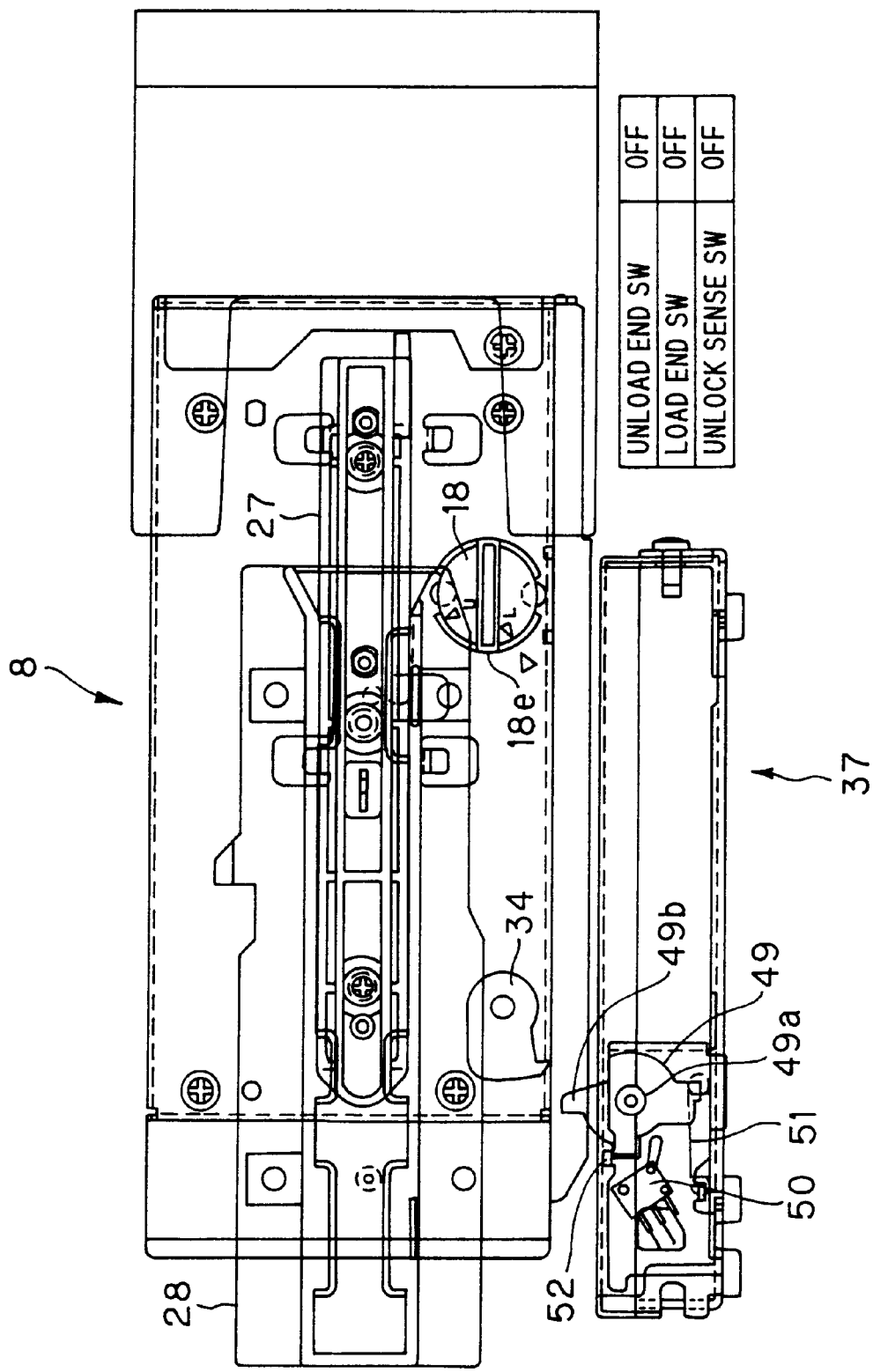
FIG. 22 is a side view illustrating the state in which the toggle arm comes closer to the detector during the loading operation of the stocker to which the unlocking operation has not been applied.
Figure 23:
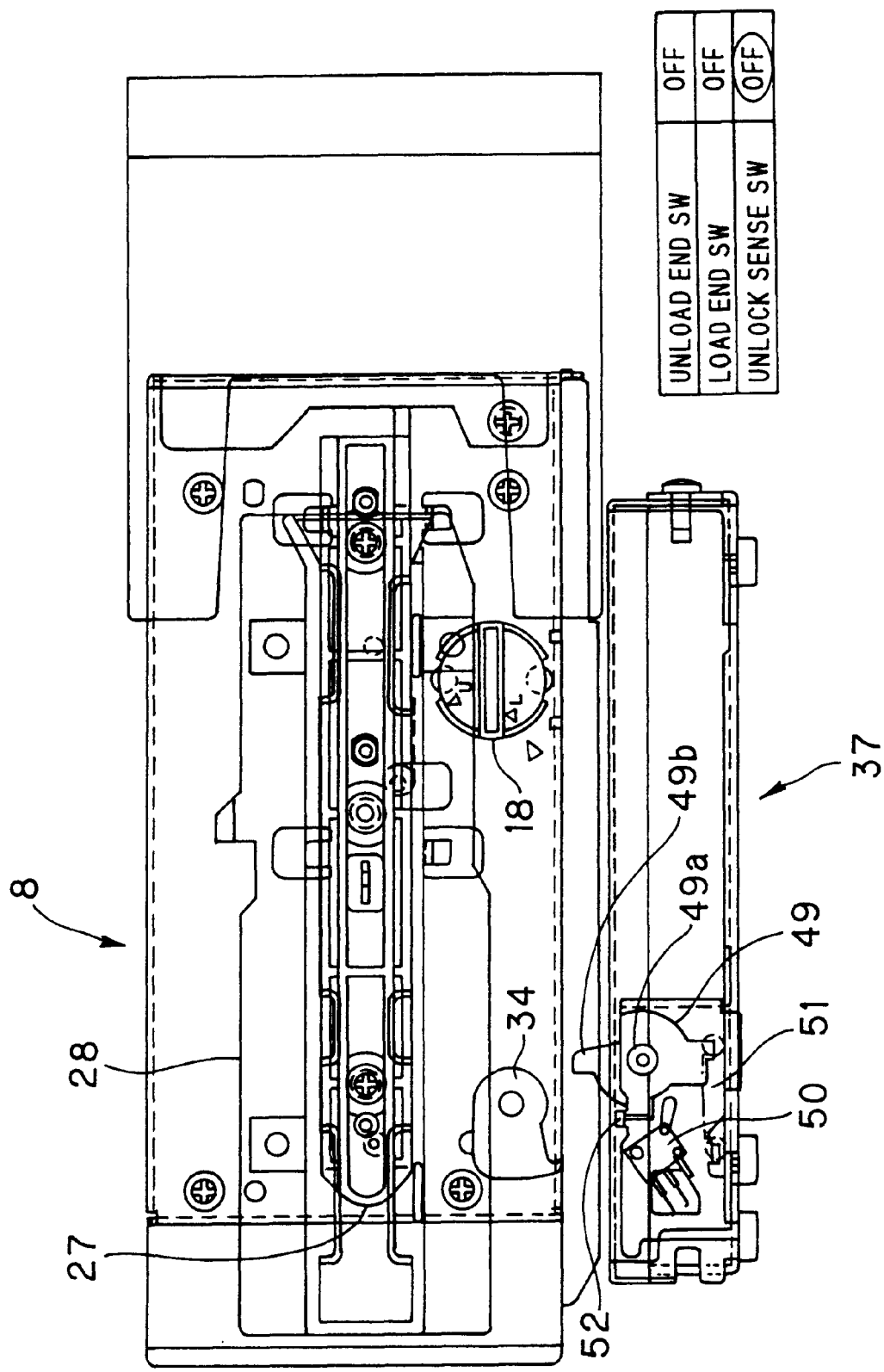
FIG. 23 is a side view illustrating the state in which the toggle arm moves above the detector without being detected by means of the detector during the loading operation of the stocker to which the unlocking operation has not been applied.
Figure 24:
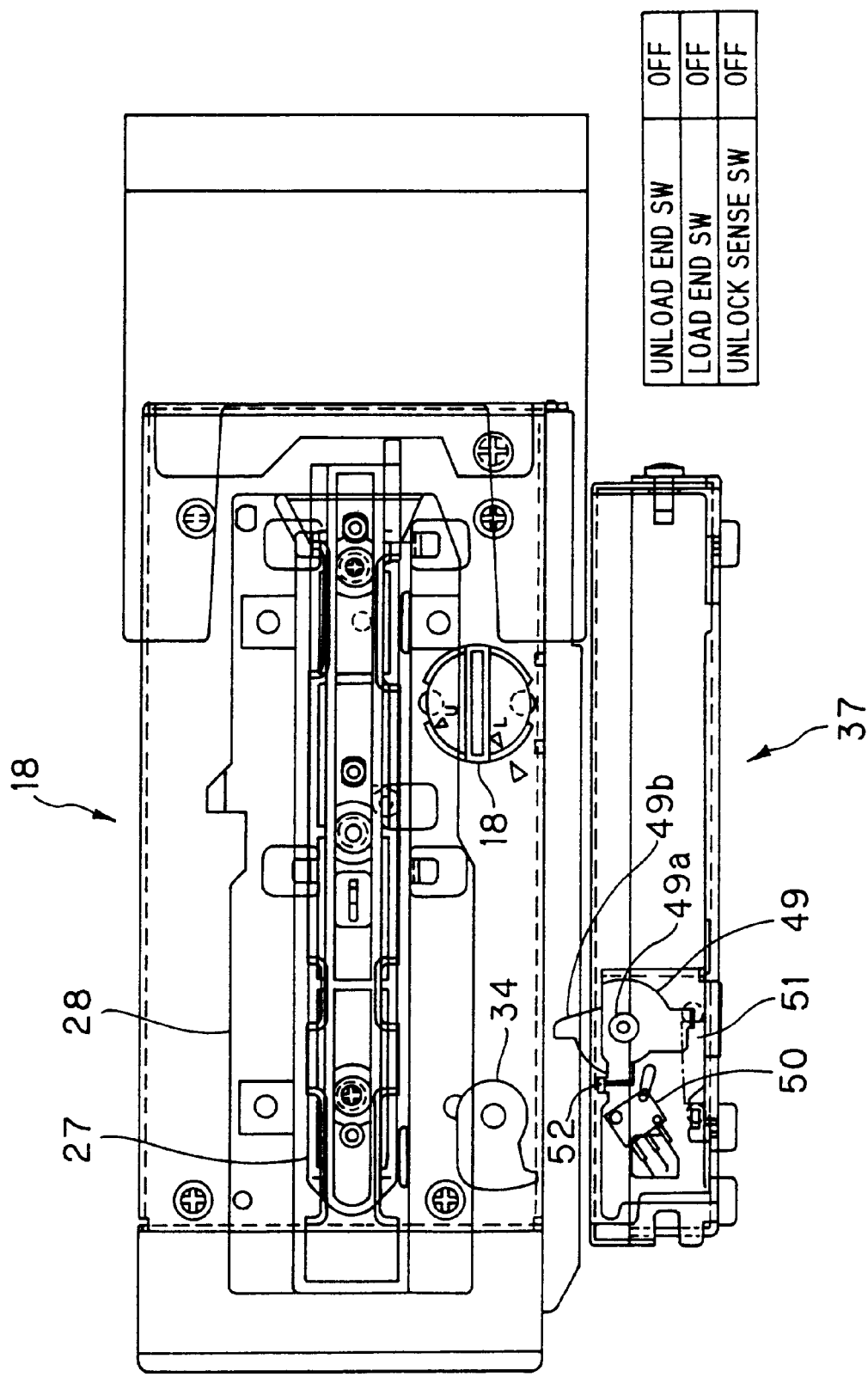
FIG. 24 is a side view illustrating the state in which the toggle arm moves further above the detector during the loading operation of the stocker to which the unlocking operation has not been applied.
Figure 25:
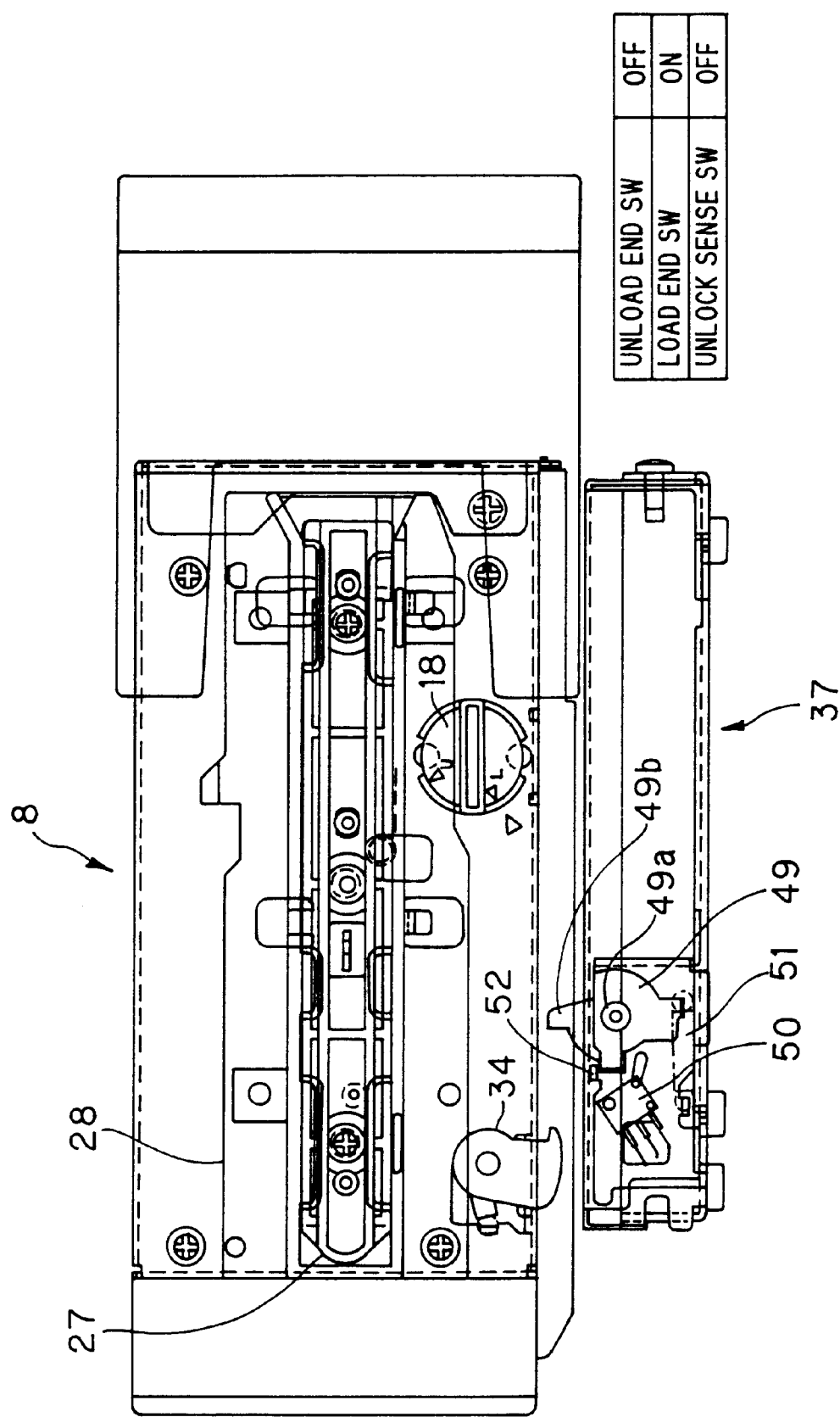
FIG. 25 is a side view illustrating the completion of the loading operation of the stocker to which the unlocking operation has not been applied.

The changer is provided in its inside with a loading device as shown in FIGS. 17 and 21 for automatically loading or unloading the stocker 8 serving as the 20 disc-storable hyper magazine.

The loading device has a housing 37*a*, which is formed into a tray-shape. On the housing 37*a*, there are provided a motor 38 for providing a loading or unloading power, a worm gear 39 that is rotatable by the output of the motor 38, a worm wheel 40 engaging with the worm gear 39, two driven gears 41*a*, 41*b* that locate in the perpendicular direction to the loading or unloading direction so as to engage with the worm wheel 40, and loading arms 42*a*, 42*b* disposed on the driven gears 41*a*, 41*b*, respectively.

The loading arms 42*a*, 42*b* are formed into a pin, which stands to project toward the upper portion of the housing. The pin-shaped loading arms 42*a*, 42*b* are fixed on circular plates 43*a*, 43*b*, respectively, which are placed on the driven gears 41*a*, 41*b* so as to permit to rotate relative to them. Rotation of the circular plates 43*a*, 43*b* on the driven gears by a prescribed angular range is permitted. A torsion spring 44 locates between the circular plate 43*a* and the driven gear 41*a* in order to impart a resilient force to the circular plate 43*a* so as to rotate it relative to the driven gear 41*a* in the counterclockwise direction in FIG. 17. The other torsion spring 44 locates between the circular plate 43*b* and the driven gear 41*b* in the same manner. The base plate 45 provided on the bottom of the stocker 8 has cam grooves 45*a*, 45*b*, which are formed into an L-shape so as to correspond to the loading arms 42*a*, 42*b*, respectively.

Each of the circular plates 43*a*, 43*b*, which support the loading arms 42*a*, 42*b*, respectively, has a pair of projections 46, 47. A loading/unloading switch 48 is mounted on the housing 37*a* so as to be in the "ON" or "OFF" position by means of the projection 46 or 47. The lading/unloading switch 48 has an unload-end switch and a load-end switch.

Now, description will be given below of the operation of the loading device 37 for loading or unloading the stocker 8.

Figure 16:
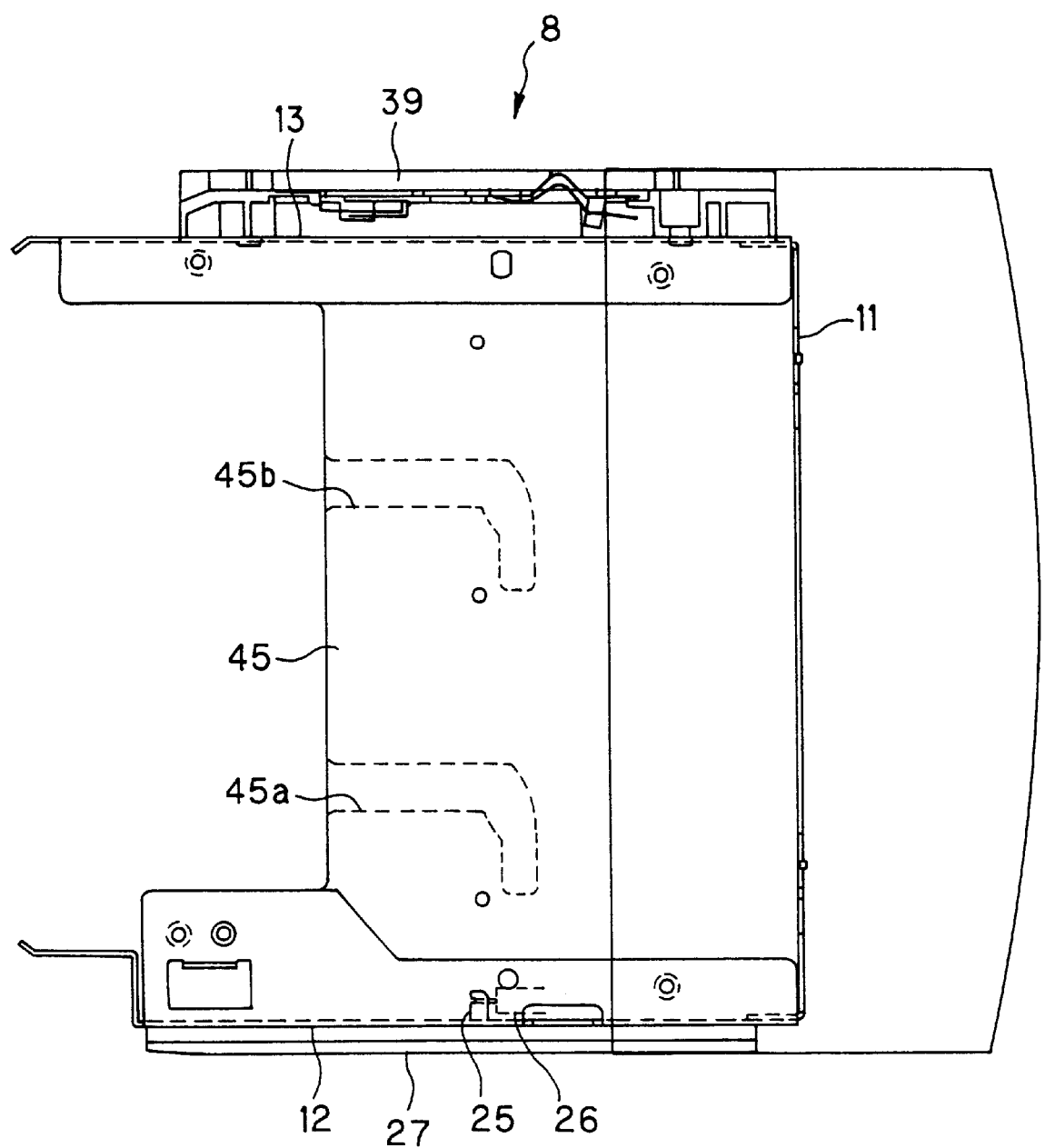
FIG. 16 is a plan view illustrating the stocker from which a disc lack is removed.
Figure 18:
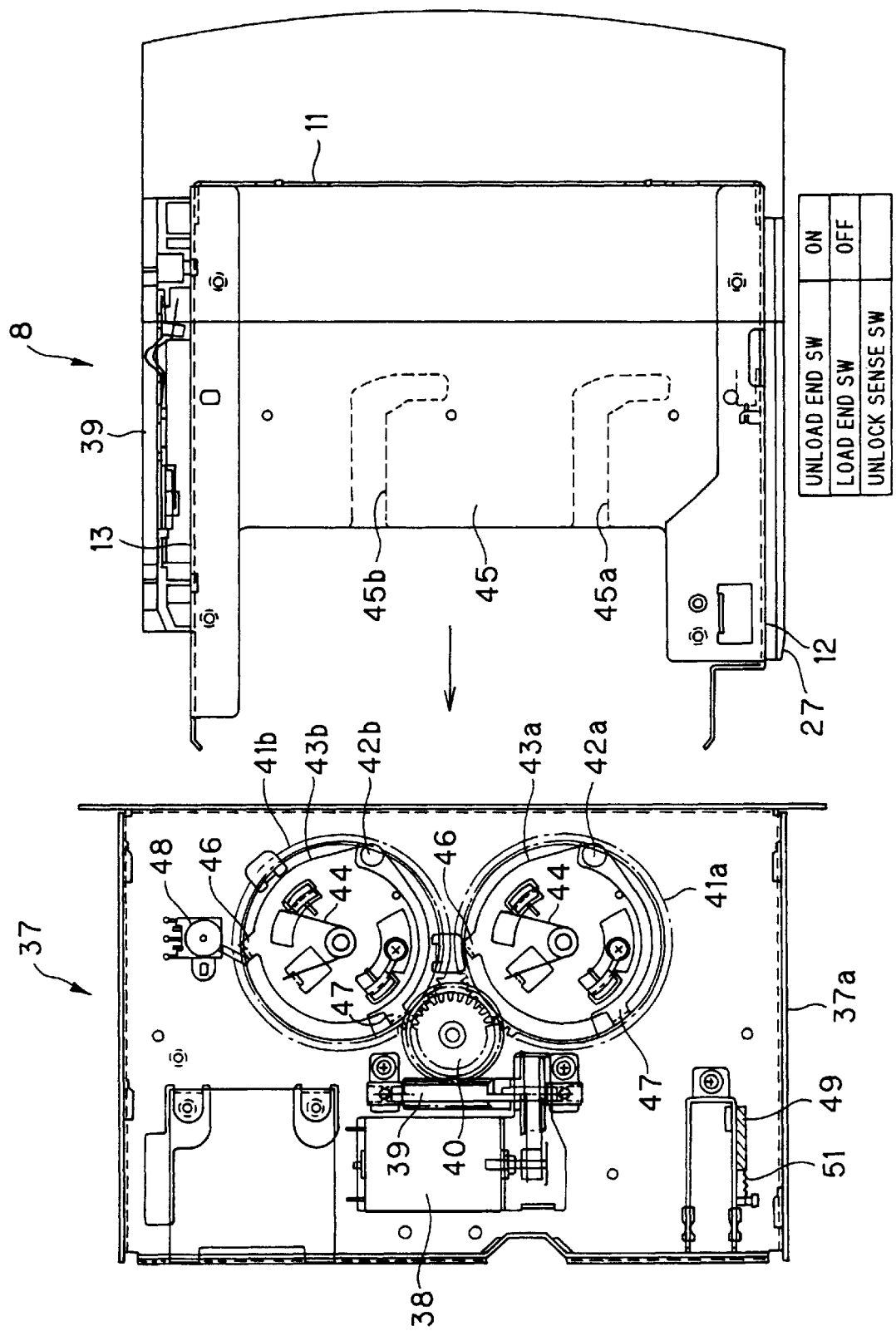
FIG. 18 is a plan view illustrating the stocker, which is kept in the unloaded state.

When the stocker 8 is in the unloading state, the one projection 46 of the circular plate 43*b* causes the unload-end switch to be in the "ON" position as shown in FIGS. 16 to 18. In this state, it is possible to load the stocker 8 in the changer or unload it therefrom.

Figure 19:
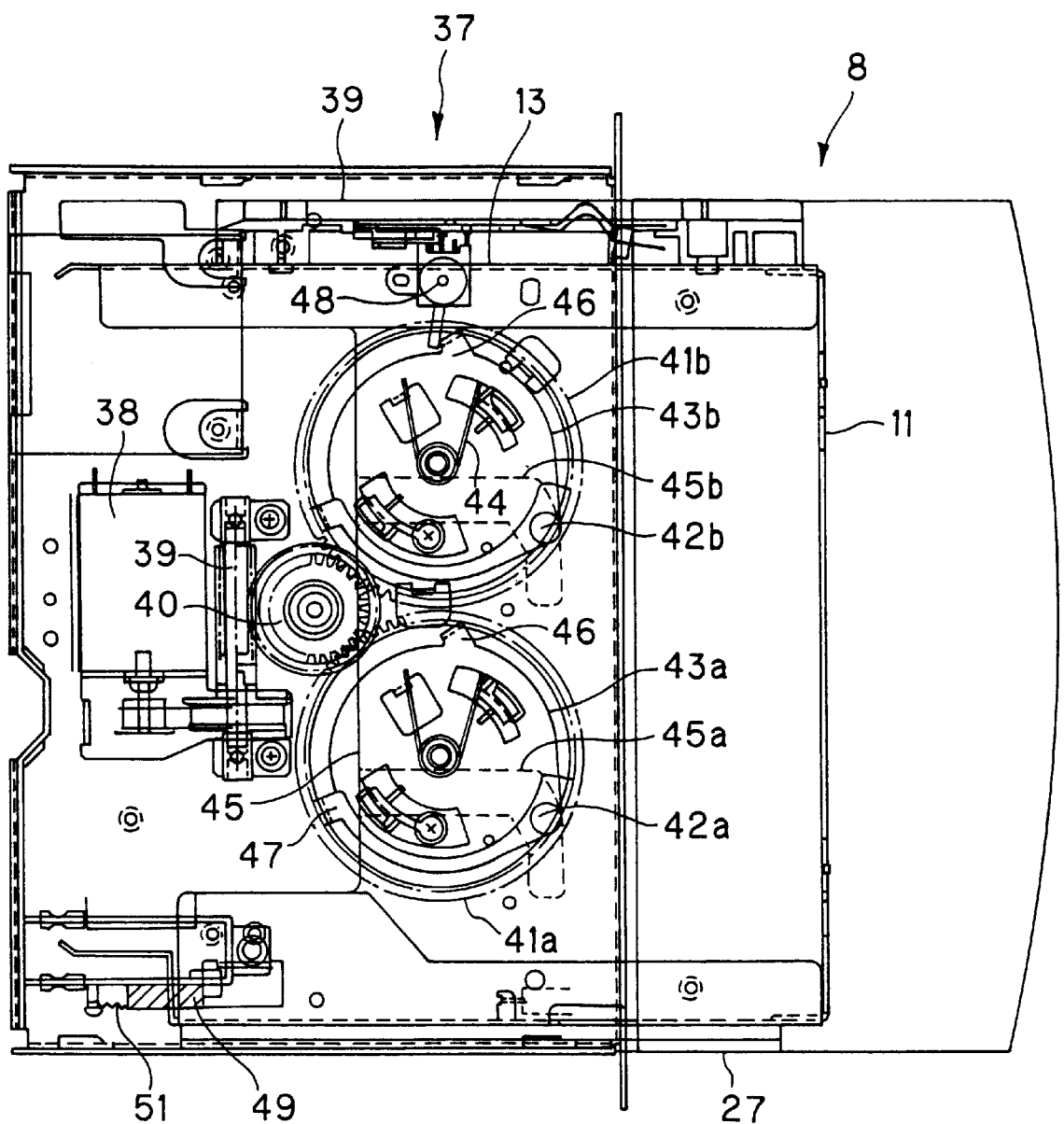
FIG. 19 is a plan view illustrating the stocker, which is in the starting state of load.

When the stocker 8 is inserted into the slot 2 (see FIG. 1) of the changer as shown in FIG. 19 and the loading operation is started, the loading arms 42*a*, 42*b* that locate in the cam grooves 45*a*, 45*b* of the stocker 8, come into contact with the corner portions of the cam grooves 45*a*, 45*b*. Accordingly, the circular plates 43*a*, 43*b* rotate on the driven gears 41*a*, 41*b*, respectively so that the unload-end switch of the loading/unloading switch 48 is in the "OFF" position. The changer recognizes the fact that the unload-end switch is in the "OFF" position. Then, the changer recognizes the insertion of the stocker 8 and causes the motor 38 to start.

Figure 20:
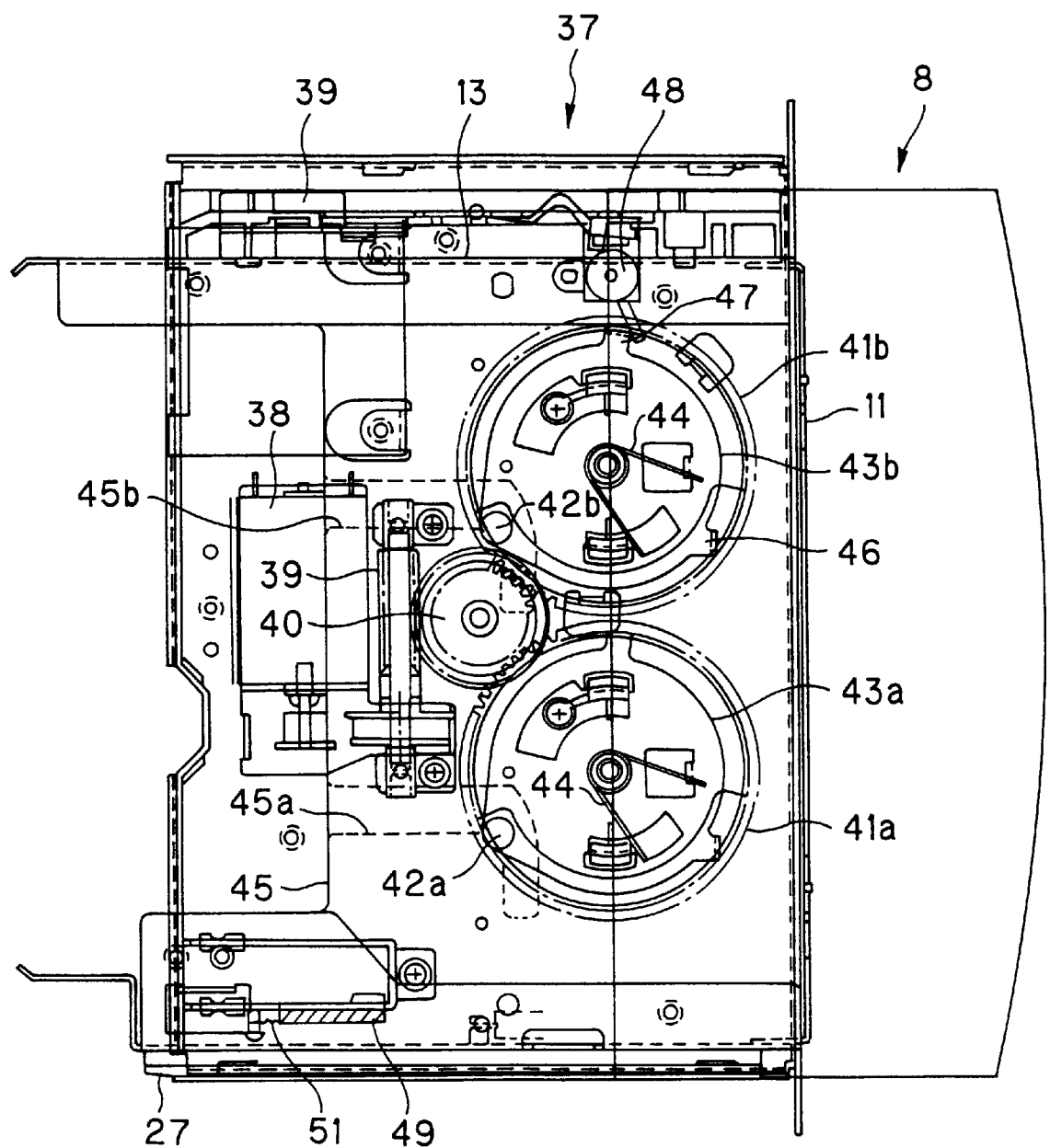
FIG. 20 is a plan view illustrating the stocker, which is in the completion state of load.

When the motor 38 operates and the drive gears 41*a*, 41*b* rotate, the loading arms 42*a*, 42*b* enter the innermost recesses of the bent portions of the cam grooves 45*a*, 45*b* so as to pull the stocker 8 further as shown in FIG. 20. The loading arms 42*a*, 42*b* move by a prescribed distance, which corresponds to the rotational angle of 90 degree of the circular plates 43*a*, 43*b*, with the result that the other projection 47 causes the load-end switch to be in the "ON" position. The operation of the motor 38 is stopped, thus completing the loading of the stocker 8.

When the electric power source for the changer is cut off, the loading/unloading switch 48 does not detect the movement of the loading arm 42*b*. Accordingly, the motor 38 does not operate. Even when an attempt to insert the stocker 8 into the slot 2 is made in such a state, the engagement of the worm gear 39 with the worm wheel 40 prevents the further insertion of the stocker 8 as shown in FIG. 19. It is therefore impossible to load the stocker 8 in the changer or unload it therefrom. If it is possible to pull, unlike the present invention, the stocker 8 out of the changer in the cut-off condition of the electric power source, turn the release knob 18 to unlock the locking member so as to permit to pull the disc 1 out of the stocker 8 or add a new disc into it, and then, load or unload again the stocker 8 in the changer, the trace of operation for pulling the disc 1 out of the stocker 8 or adding the new disc into it disappears. In the present invention, such an inconvenient problem can be avoided by making it impossible to load the stocker 8 in the changer or unload it therefrom in the cut-off condition of the electric power source.

In the changer, there may be adopted a structure in which the stocker 8 can automatically be transferred in accordance with instructions for pulling the stocker 8 out of the changer. The reverse operation of the motor 38 can achieve such a structure.

The changer has a detecting device for detecting, in cooperation with the toggle arm 34 serving as the trace record device, whether or not the stocker 8 has been in the unlocking state outside the changer, i.e., whether or not there has been applied the operation for permitting to pull the disc 1 out of the stocker 8 or add a new disc into it.

Figure 26:
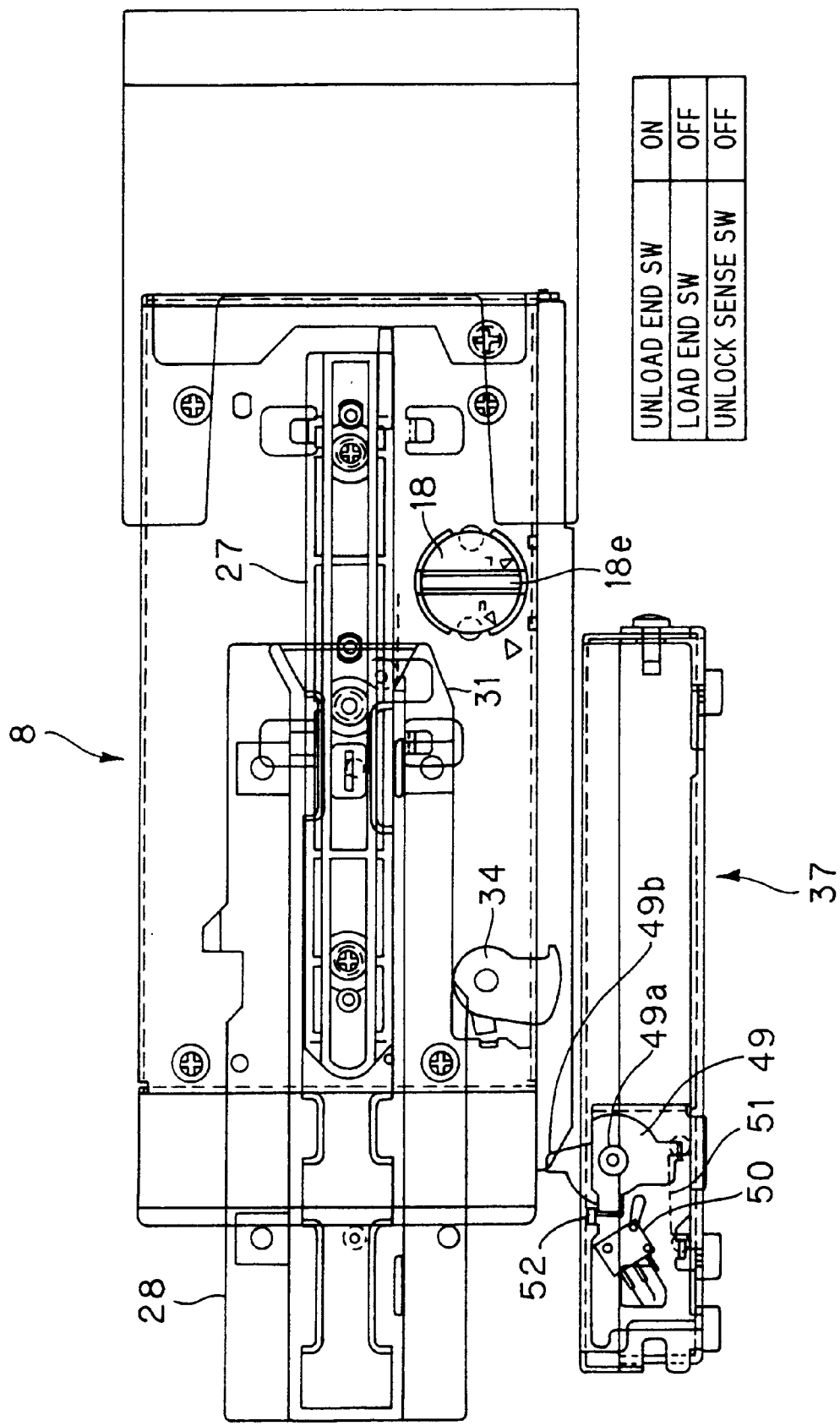
FIG. 26 is a side view illustrating the state in which the toggle arm comes close to the detector during the loading operation of the stocker to which the unlocking operation has already been applied.

The detecting device has a detector 49 for detecting the toggle arm 34 and an unlock-detection switch 50 as shown in FIGS. 17 and 21. As shown in FIGS. 21 to 30, the detector 49 is pivotably supported on the housing 37a of the loading device 37 through a horizontal pivot shaft 49. An extension coil spring 51, which is spread between the detector 49 and the housing 37a, gives an resilient force to turn the detector 49 in the clockwise direction in FIGS. 21 to 30 to the detector 49. The contact of the detector 49 with a stopper 52 provides the limitation of the turn of the detector 49. The detector 49 has a projection 49b, which projects, in the stopped state of the detector 49, within a travelling passage along which the toggle arm 34 moves in the unlocked state as shown in FIG. 26 along with the movement of the stocker 8. When the stocker 8 to which the unlocking operation has already been applied outside the changer is loaded in the changer and the toggle arm 34 projecting below the stocker 8 comes into contact with the detector 49, the toggle arm 34 presses the detector 49 to cause the latter to turn around the pivot shaft 49a by a prescribed rotational angle. The unlock-detection switch 50 detects the turn of the detector 49 and detects a trace of whether or not the stocker 8 has been in the unlocking state outside the changer, i.e., whether or not there has been applied the operation for permitting to pull the disc 1 out of the stocker 8 or add a new disc into it. The changer or a host computer mentioned later makes, on the basis of the detection signal from the unlock-detection switch 50, a decision that a disc-check operation and other check operations should be applied to the disc stored in the stocker 8.

Figure 31:
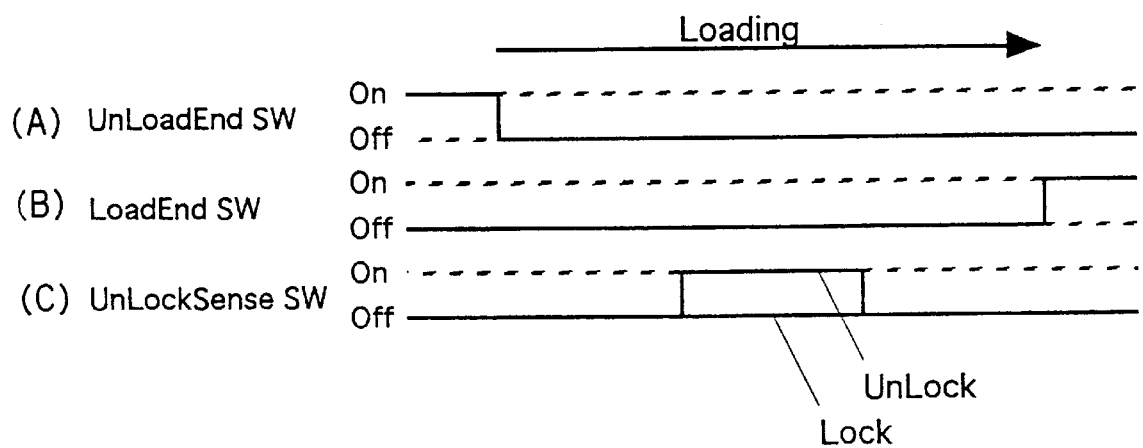
FIG. 31 is a waveform chart for detecting the existence of the trace of the unlocking operation of the stocker.

The signal detection by the detecting device will be described below with reference to FIG. 31. If the unlock-detection switch 50 detects the existence of the toggle arm 34 during a period of time of from the loading of the stocker 8 to the switching operation of the unload-end switch of the loading/unloading switch 48 from the "ON" position to the "OFF" position (see FIG. 31(A)) as well as the switching operation of the load-end switch thereof from the "OFF" position to the "ON" position (see FIG. 31(B)), it sends a signal. If the unlock-detection switch 50 does not detect the existence of the toggle arm 34 during the above-mentioned period of time, is sends no signal (see FIG. 31(C)). The changer or the host computer mentioned later recognizes, on the basis of the signal from the unlock-detection switch 50, whether or not the stocker 8 has been in the unlocking state in the off-line condition, and more specifically, the existence of the trace of operation, by which the disc 1 might have been lodged in the stocker 8 or dislodged from it.

Figure 32:
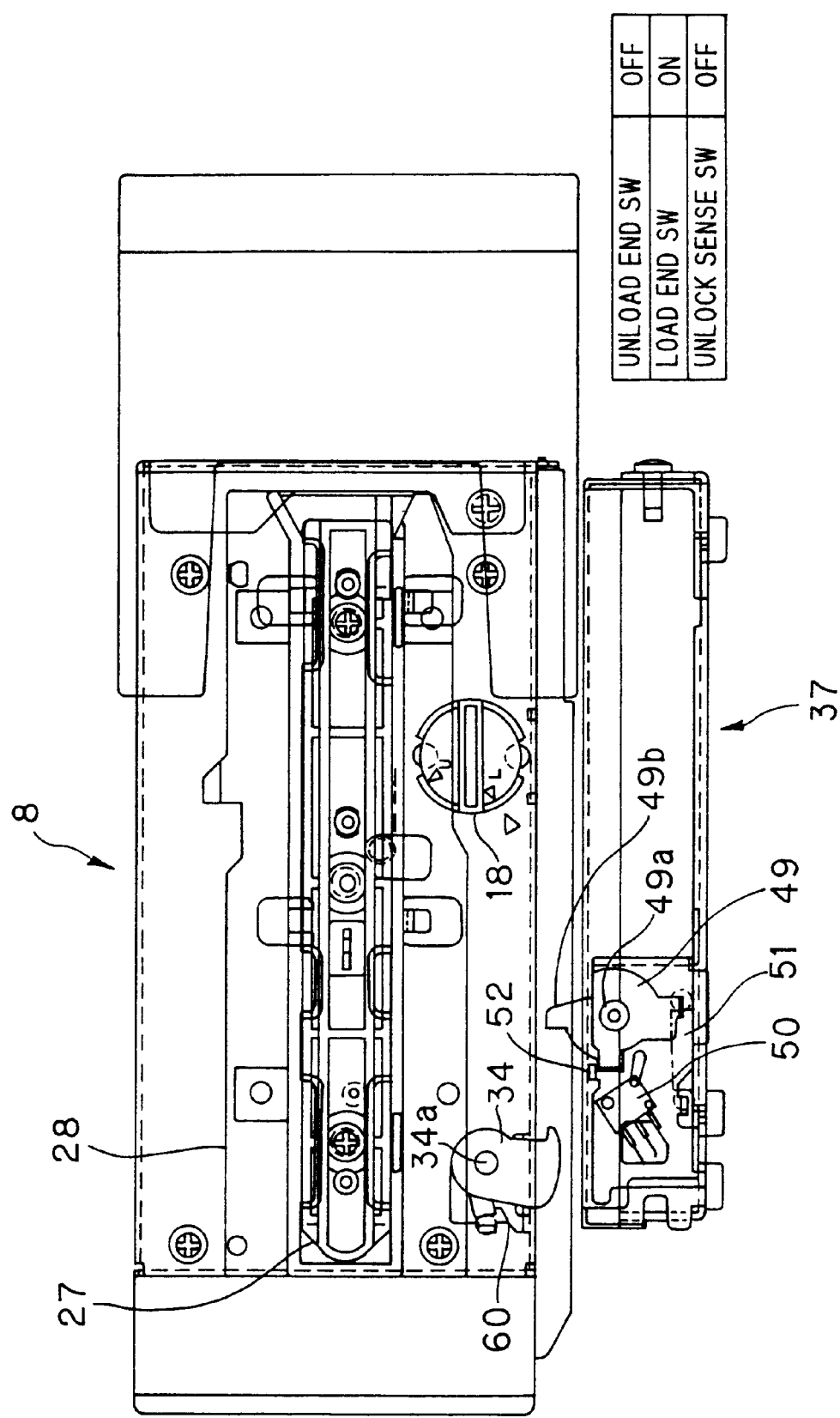
FIG. 32 is a side view illustrating the starting state of the unloading operation of the stocker.
Figure 33:
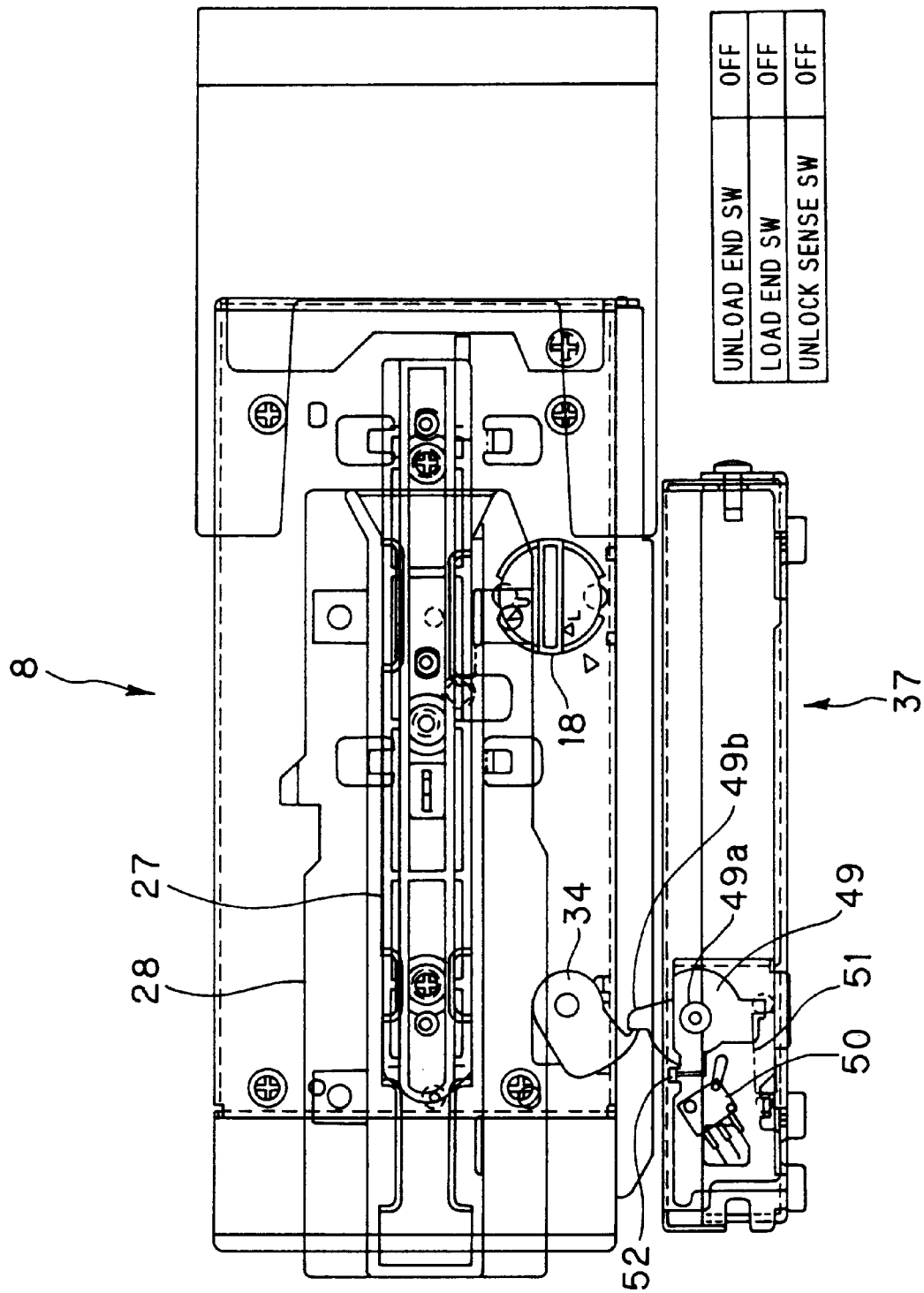
FIG. 33 is a side view illustrating the state in which the toggle arm is returning to the locking position during the unloading operation of the stocker.
Figure 34:
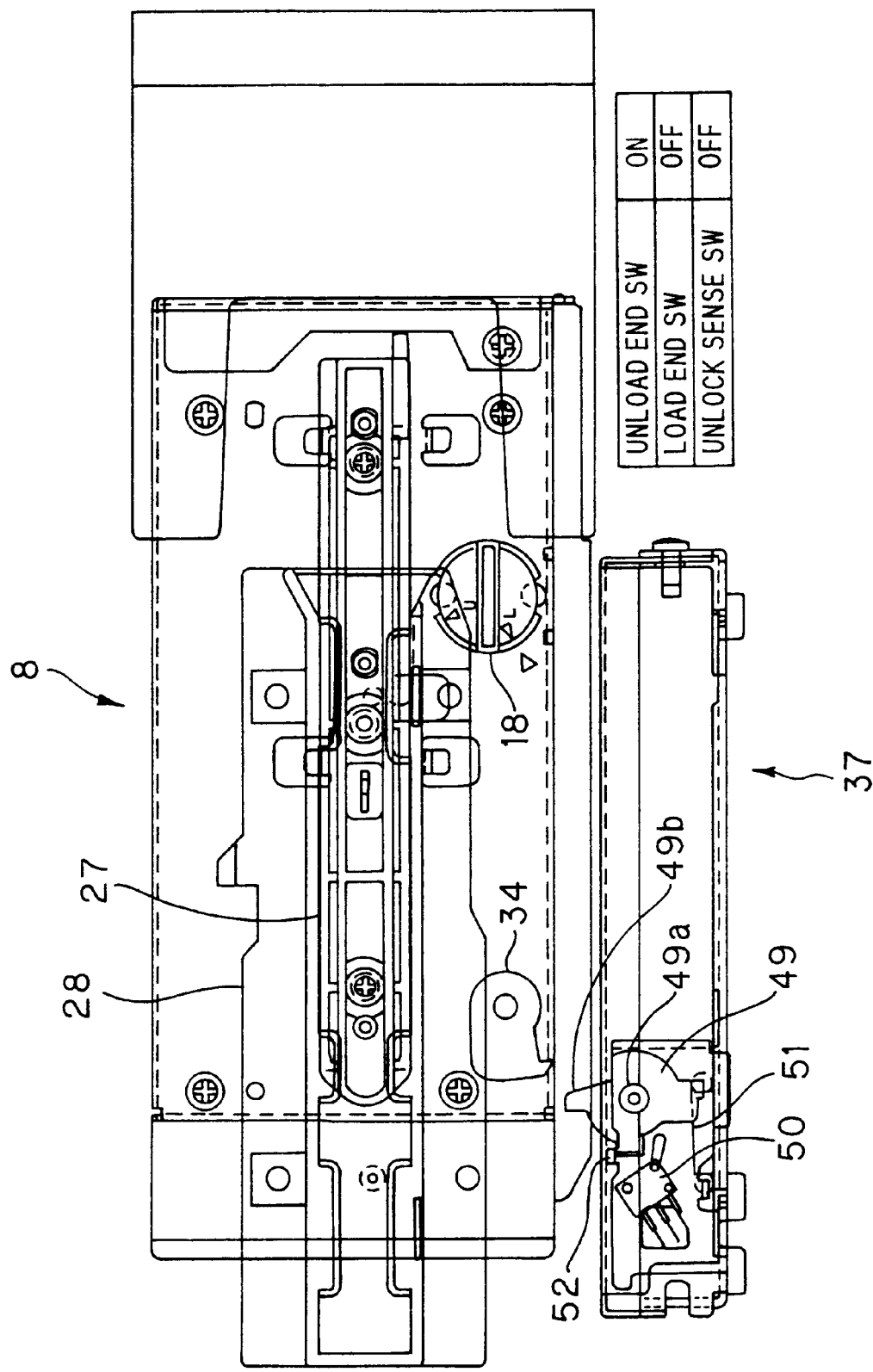
FIG. 34 is a side view illustrating the completion state of the unloading operation of the stocker.

The above-described detecting device have a function of erasing the above-mentioned trace when the stocker 8 is pulled out of the changer. More specifically, the toggle arm 34 comes into contact with the detector 49 when the stocker 8 is unloaded from the changer as shown in FIGS. 32 to 34. The detector 49 comes into contact with the stopper 52 so as not to turn in the clockwise direction in FIGS. 32 to 34. Accordingly, the unloading operation of the stocker 8 brings the toggle arm 34 and the detector 49 into contact with each other and causes the toggle arm 34 to turn into the other swing-limitation position. As a result, the toggle arm 34 swings beyond the change point as shown in FIG. 15(B) against the resilient force of the dead-point spring 60 so as to be received within the housing. The above-mentioned trace is erased and the stocker 8 is pulled out of the changer.

Now, description will be given below of the operation of the stocker and the changer, which have the above-described structures.

(1) In the case where the stocker is put in the locking state outside the changer The stocker 8 is put in the locking state as shown in FIGS. 3 and 4 after it is unloaded from the disc changer. In the locking state, the locking member 17 is always pressed in the locking direction (i.e., the left-hand direction in FIGS. 3 and 4) under the function of the resilient force given by the spring 26. Consequently, the projection portion 17a of the locking member 17 prevents the disc holder 15 from being deformed, thus making it impossible to remove the disc 1 from the rack groove 14a of the disc rack 14.

When the release knob 18 of the locking member 17 is put in the locking state, the stocker 8 can be loaded into the changer without bringing the release knob 18 into contact with the cam portion 31 of the guide rail 28, as shown in FIGS. 21 to 25.

Figure 9:
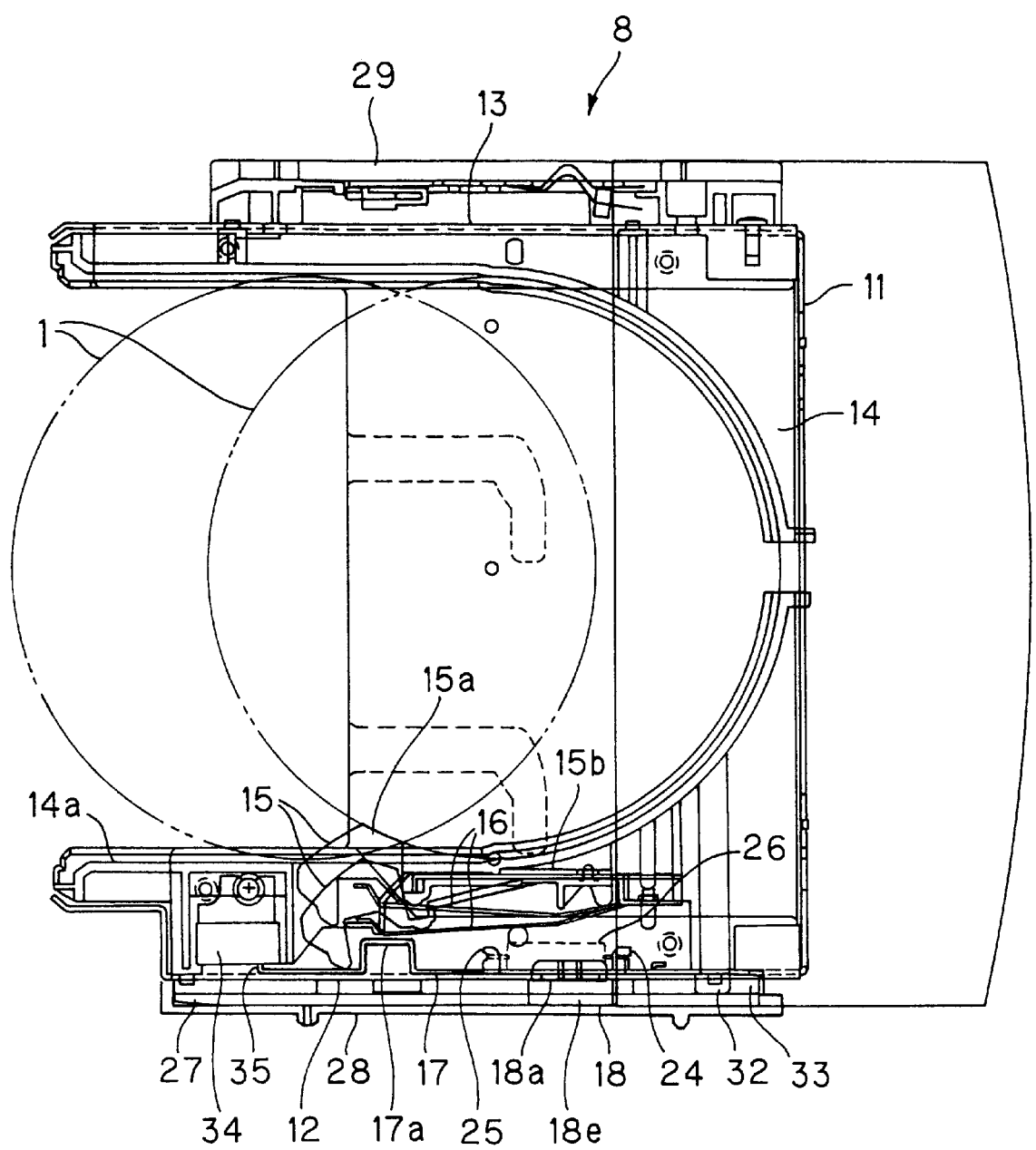
FIG. 9 is a plan view illustrating the stocker, which is kept in the unlocking state in the changer.
Figure 10:
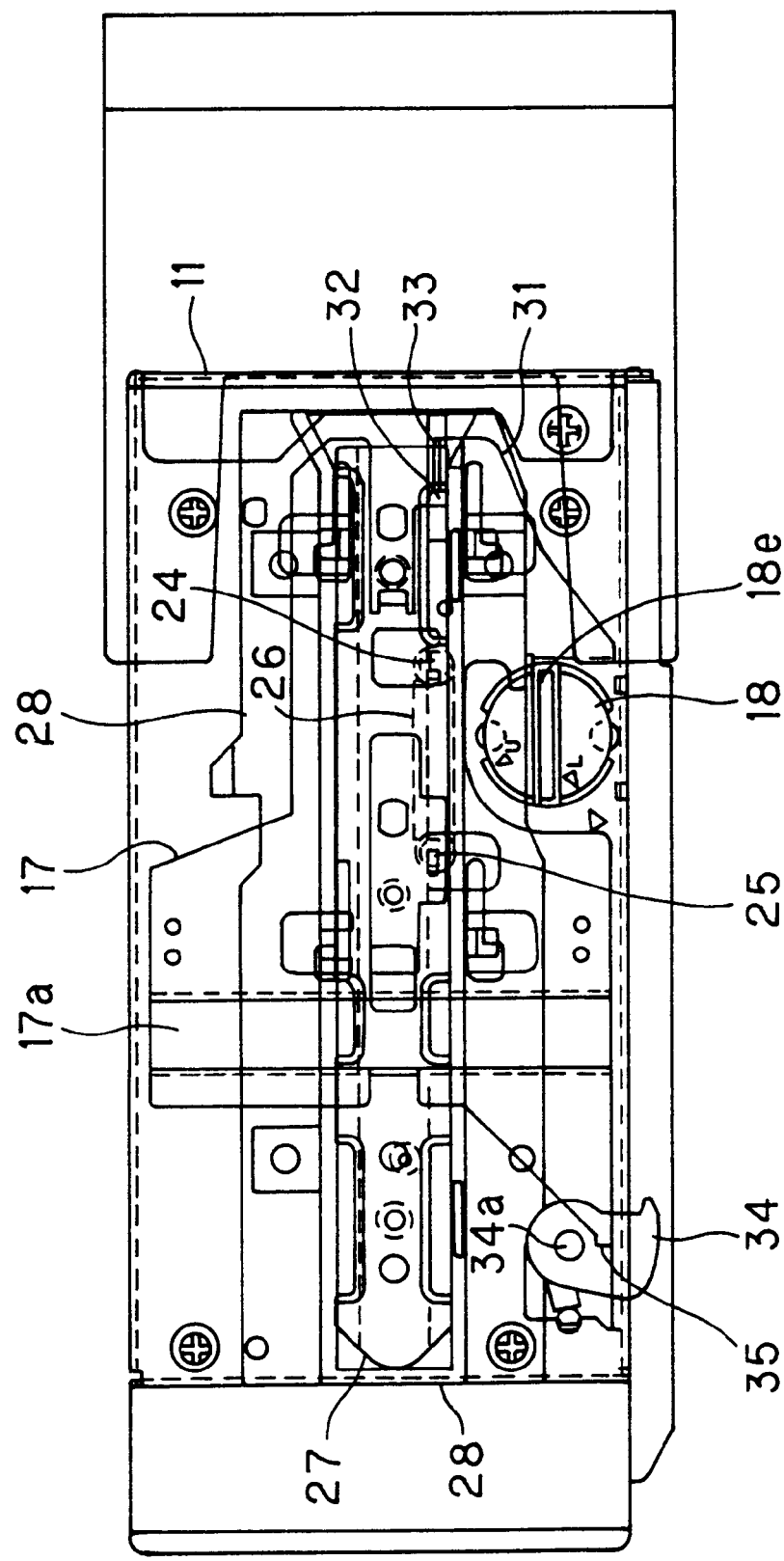
FIG. 10 is a left-hand side view of the stocker as shown in FIG. 9.

When the loading operation of the stocker 8 into the disc changer is completed as shown in FIGS. 9 and 10, the projection 32 of the guide rail 28 presses the projecting piece 33 of the locking member 17 so as to push it back. As a result, the locking member 17 moves in the unlocking direction (i.e., in the right-hand direction in FIGS. 9 and 10) against the resilient force of the spring 26. The movement of the locking member 17 in the unlocking direction causes the toggle arm 34 to project below the housing of the stocker 8 as shown in FIGS. 15(A) and 15(B).

The disc holder 15 can be deformed in the disc changer in this manner so that the disc 1 can be transferred.

When the stocker 8 is pulled out of the changer, the rocking member 17 moves again in the locking direction by means of the spring 26. The movement of the rocking member 17 makes it possible to prevent the disc 1 from coming off the stocker 8. The toggle arm 34 retracts completely in the housing of the stocker 8, thus erasing the trace of the unlocking operation, as shown in FIGS. 32 to 34.

The loading of the stocker 8 in the changer and the unloading of it therefrom are carried out by the operation of the loading device 37. The loading or unloading operation cannot be carried out when the electric power source for the changer is cut off.

(2) In the case where the stocker is put in the unlocking state outside in the changer When the release knob 18 turns toward the unlocking direction as shown in FIGS. 5 and 6 outside the changer, the locking member 17 moves toward the unlocking direction (i.e., the right-hand direction in FIGS. 5 and 6) against the resilient force given by the spring 26. The release knob 18 is put in the unlocking state under the resilient force given by the spring 26, by which the locking member 17 is pulled. In such an unlocking state, the disc holder 15 can be deformed so that the disc 1 can be inserted into the stocker 8 or discharged therefrom.

When the stocker 8 is put in the unlock state outside the changer, the toggle arm 34 projects below the housing of the stocker 8. The toggle arm 34 is kept in the projecting state, thus providing the trace of the unlocking operation.

When the release knob 18 turns toward the locking direction, the locking member 17 moves in the unlocking direction (i.e., in the left-hand direction in FIGS. 5 and 6) so as to prevent again the disc holder 15 from being deformed. Even in such a case, the projecting state of the toggle arm 34 is maintained, thus providing the trace indicating the fact that the unlocking operation has been made outside the changer.

When the stocker 8, which has been put in the unlocking state, is loaded into the changer, the cam portion 31 of the guide rail 28 presses the elongated projection 18e of the release knob 18 in the middle of the loading action to turn the release knob 18 in the locking direction. Consequently, when the stocker 8 is unloaded next from the changer, the release knob 18 is always put in the locking state.

Figure 28:
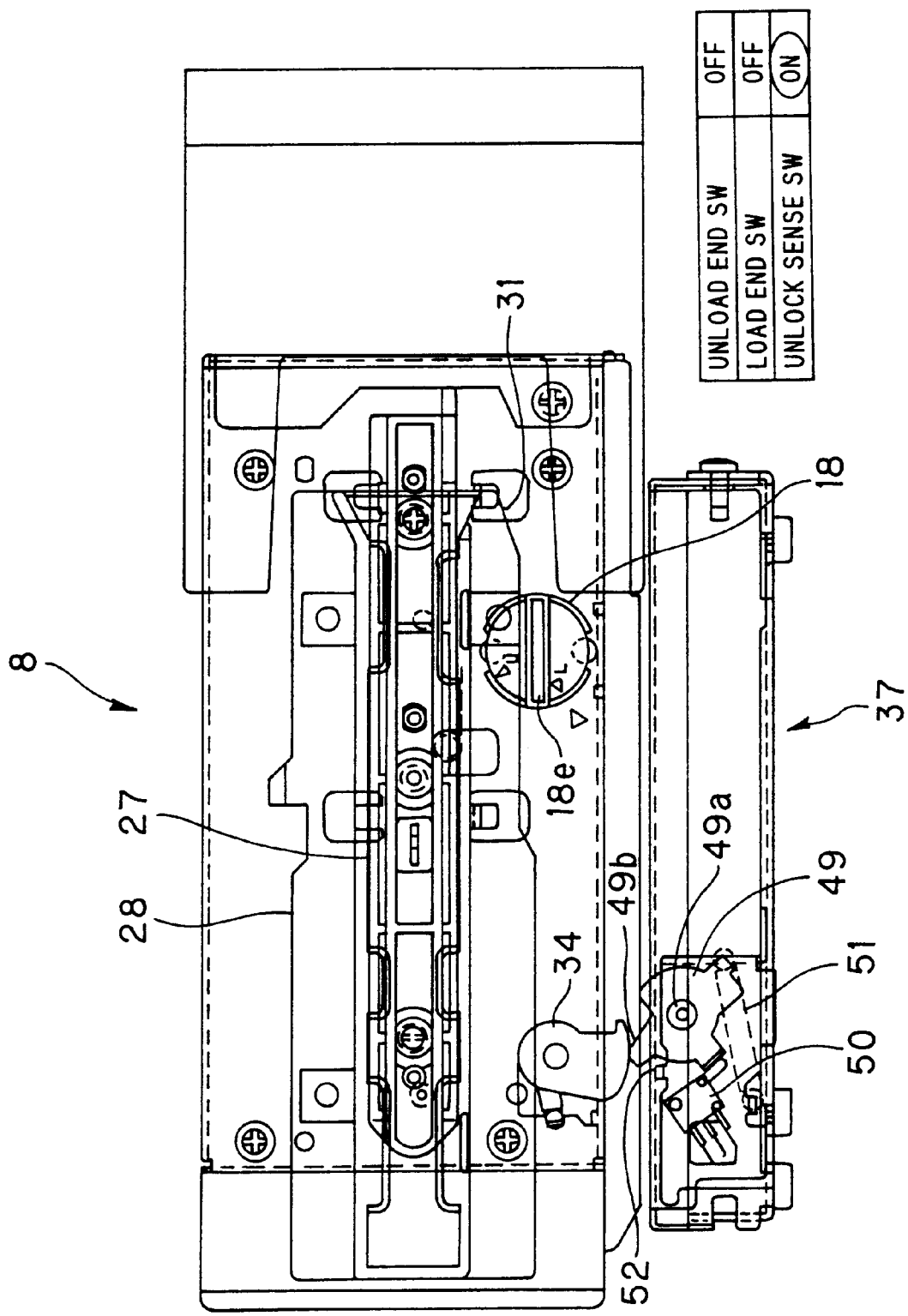
FIG. 28 is a side view illustrating the state in which the return of the release knob to the locking position is completed and the toggle arm is detected by means of the detector during the loading operation of the stocker to which the unlocking operation has already been applied.
Figure 29:
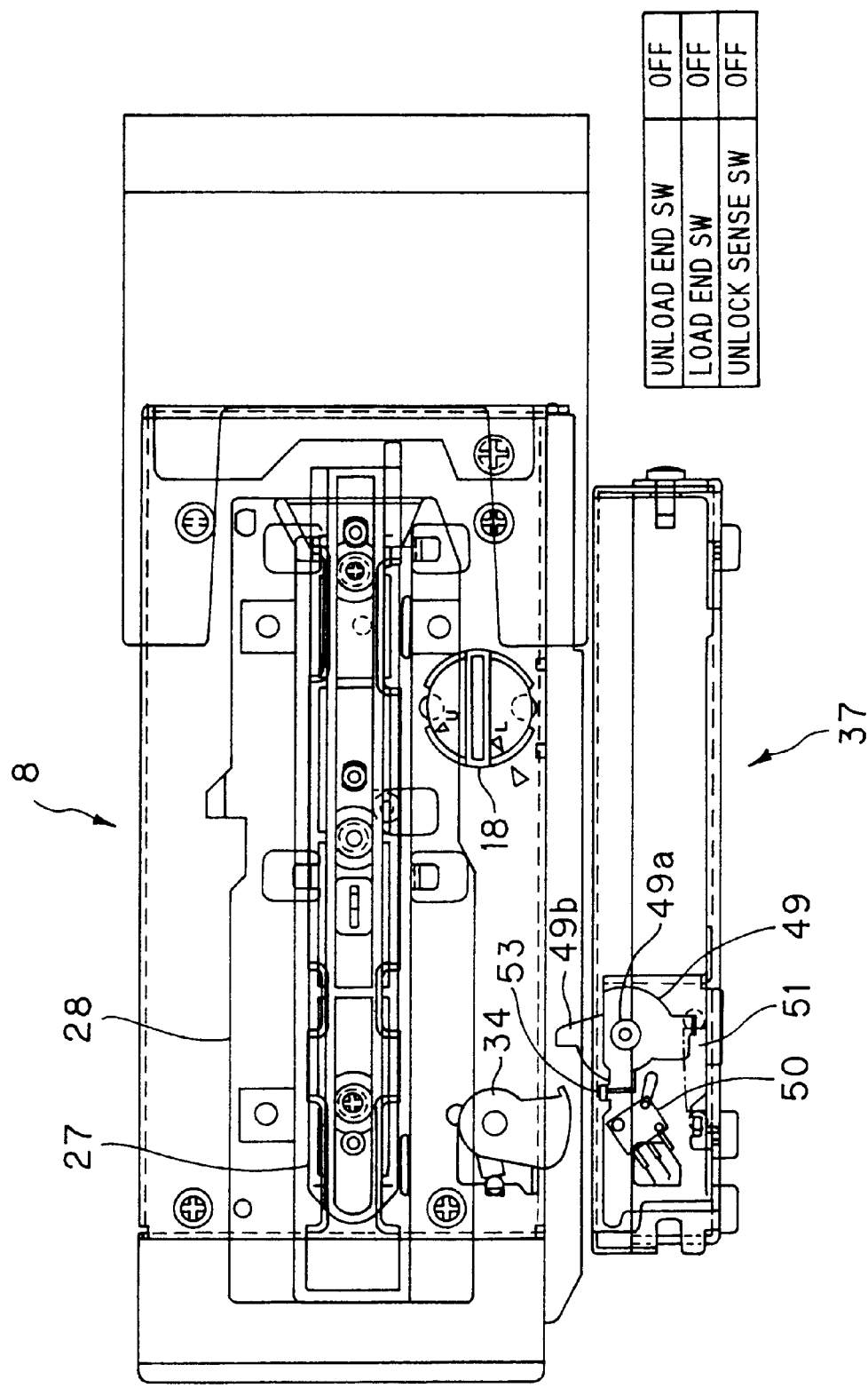
FIG. 29 is a side view illustrating the state in which the toggle arm moves above the detector during the loading operation of the stocker to which the unlocking operation has already been applied.
Figure 30:
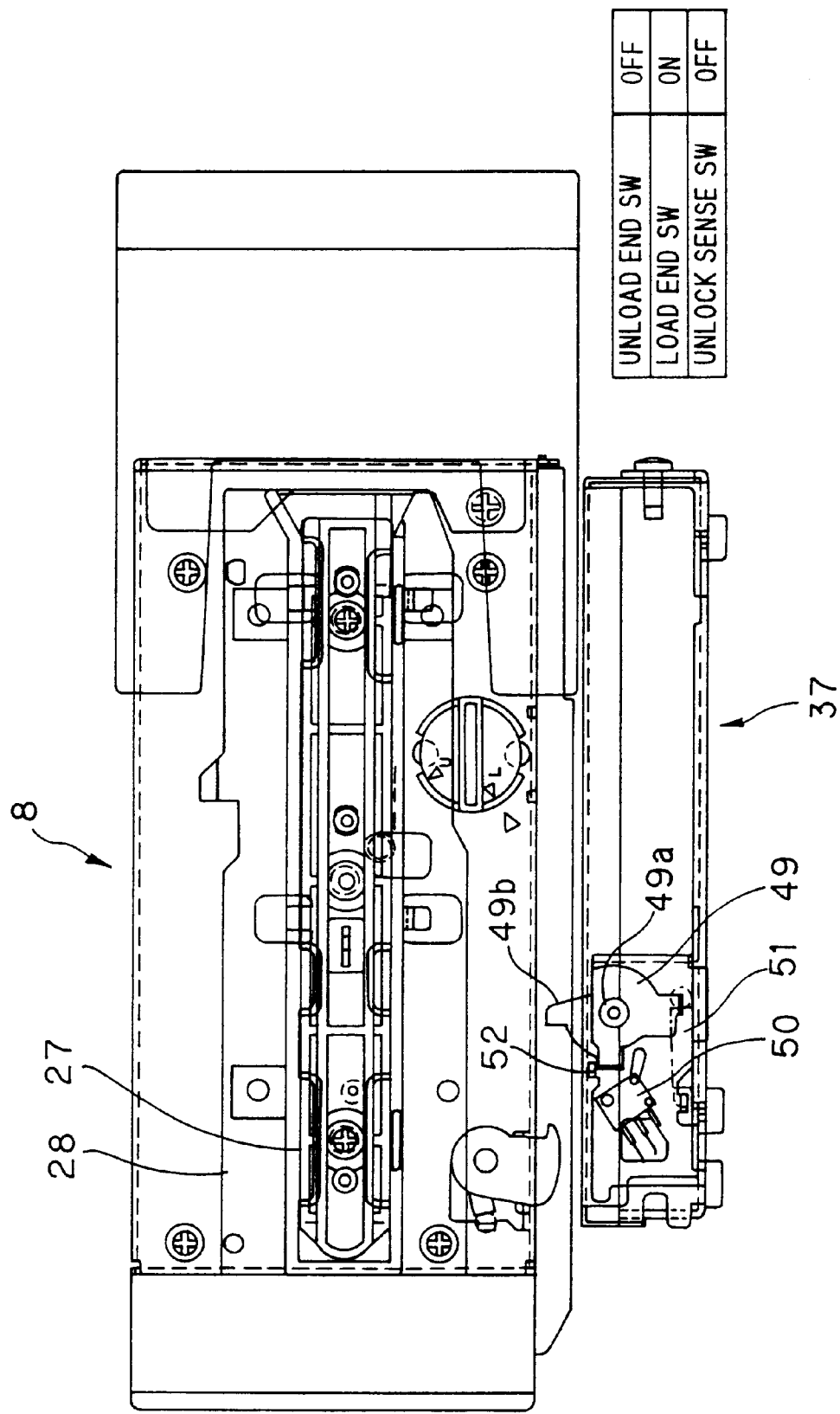
FIG. 30 is a side view illustrating the completion of the loading operation of the stocker to which the unlocking operation has already been applied.

The toggle arm 34 pushes the detector 49 of the detecting device during the loading operation of the stocker 8 as shown in FIGS. 26 to 28. The unlock-detection switch 50 generates a signal "ON" indicating the fact that the unlocking operation has been made outside the changer (see FIG. 28). If the unlocking operation has not been applied to the stocker 8, the unlock-detection switch 50 is kept in the "OFF" position, thus generating no signal. The changer makes, on the basis of the signal from the unlock-detection switch 50, a decision as whether or not the unlocking operation has been applied to the stocker 8 outside the changer.

When the loading operation of the stocker 8 into the disc changer is completed, the projection 32 of the guide rail 28 presses the projecting piece 33 of the locking member 17 so as to push it back, as shown in FIGS. 9 and 10. As a result, the locking member 17 moves in the unlocking direction (i.e., in the right-hand direction in FIGS. 9 and 10) against the resilient force of the spring 26.

The disc holder 15 can be deformed in the changer in this manner so that the disc 1 can be transferred.

When the stocker 8 is pulled out of the changer, the rocking member 17 moves again in the locking direction by means of the spring 26. The movement of the rocking member 17 makes it possible to prevent the disc 1 from coming off the stocker 8. The toggle arm 34 retracts completely in the housing of the stocker 8, thus erasing the trace of the unlocking operation to reset the trace record device, as shown in FIGS. 32 to 34.

The loading of the stocker 8 in the changer and the unloading of it therefrom are carried out by the operation of the loading device 37. The loading or unloading operation cannot be carried out when the electric power source for the changer is cut off.

Figure 35:
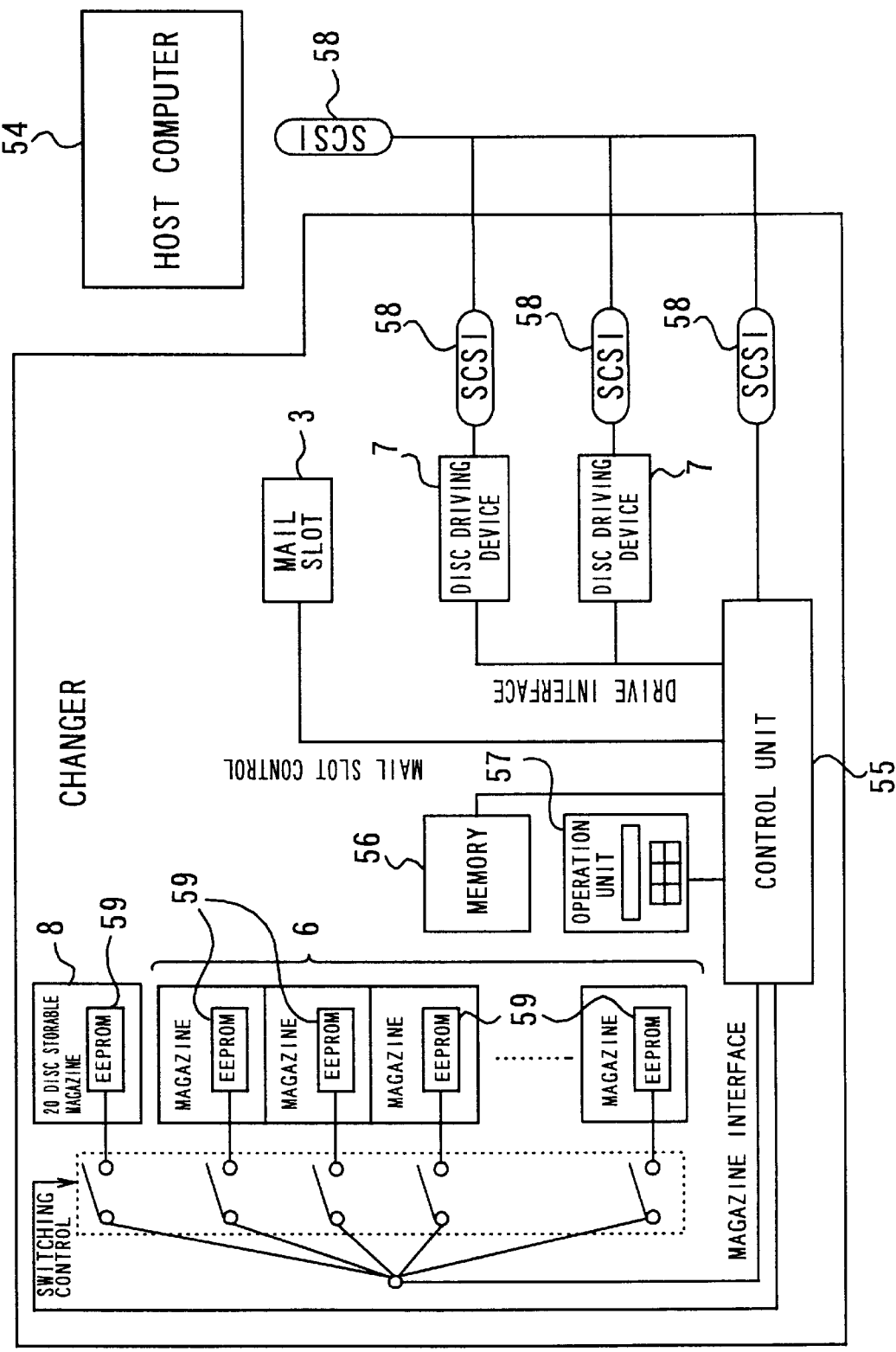
FIG. 35 is a block diagram illustrating a system for the changer.

The systematization for the changer having the above-described structure is achieved by connecting it to an external host computer 37 as shown in FIG. 35.

The changer has a control unit 55, a memory 56, an operation unit 57, an interface 58 for connecting the changer to the host computer 54, and the like, in addition to the stocker 8 serving as the 20 -storable hyper magazine, which can be inserted into the single slot 2 (see FIG. 1), the other stocker 6 serving as the 50 disc-storable magazine, which can be inserted into the other slots 4 (see FIG. 1), and disc driving devices 7.

The control unit 55 can control the relevant components to the mail slot 3 and achieve a setup operation for the changer in a manner described below. More specifically, the control unit 55 reads a data through a magazine interface from a memory 59, which is provided in each of the stockers 8, 6 and is formed for example of an EEPROM (electrically erasable/programmable read only memory), to form a data table that includes the identification numbers of the stockers 8, 6, the types thereof, the existence of the disc 1 (see FIG. 3) and the other information and store the same in the memory 56 provided in the changer.

The control unit 55 identifies the disc driving devices 7 through a drive interface and controls a disc transferring device (not shown) for transferring the disc 1 from the stockers 8, 6 to the disc driving devices 7.

The disc driving devices 7 serve as a device for reading the information recorded on the disc 1, which is stored in the stockers 8, 6. The disc driving devices 7 are composed of a DVD-R (digital video disc-recordable) driver described later. The disc driving devices 7 also serves as a device for detecting the existence of the disc 1 in the stockers 8, 6. The detection of existence of the disc 1 in the stockers 8, 6 can be carried out for example by detecting the disc 1 with the use of a pickup 44 described later when reproducing the disc 1. The above-mentioned disc transferring device (not shown) may be used as a device for detecting the existence of the disc 1 in the stockers 8, 6. In this case, the detection of existence of the disc 1 in the stockers 8, 6 can be carried out on the basis of a step for identifying the existence of the disc 1 by the disc-transferring device (not shown).

The memory 56 composes the device for identifying the type and the identification number of the stockers 8, 6, in cooperation with the above-described control unit 55. The memory 42 is formed of for example of the EEPROM. It is possible to electrically erase, write and read information in the EEPROM. There is known a memory element developed recently in which the EEPROM is received in a button-shaped package and the reading and writing a data can be performed merely by connecting the external two lines, i.e., the ground line and the data line to the element. The above-mentioned memory element is provided in each of the stockers 8, 6 in a manner as described below. More specifically, the memory element is provided in each of the stockers 8, 6 so that a pair of conductive portions formed at the slot of the changer can come into contact with a pair of terminals (i.e., the ground terminal and the data terminal) of the memory element provided in the magazine, respectively. The control unit 55 of the changer reads the identification number of each of the stockers 8, 6 from the memory element provided therein through the magazine interface. More specifically, the control unit 55 makes sequential connections of the two lines (i.e., the ground line and the data line) with the respective two conductive portions provided in the respective slots so as to read the identification number from the memory element provided in each of the stockers 8, 6.

The identification number is previously (when for example manufacturing the stockers 8, 6) recorded in the form of a data in the memory element of each of the stockers 8, 6. The stockers 8, 6 have their individual identification numbers and the same identification number is not allotted to the other stocker.

The control unit 55 and the respective disc driving devices 7 in the changer are connected to the external host computer 54 through the interface, which is designed for example for a SCSI (small computer system interface).

The changer is controlled by the host computer 54. The processing of the data table of the respective stockers 8, 6, which has been formed by the setup operation of the changer, on the one hand, and the information data read from the disc 1, on the other hand is performed under the control of the host computer 54.

With respect to the system for the changer, it is necessary to assemble, prior to the start of the system, a data base relative to all the discs 1 . . . 1 stored in all the stockers 8, 6, which are loaded in the changer. This operation will be hereinafter referred to as the "system setup". The system setup is divided into the setup for the changer and the setup for the host computer in view of the contents of the processing operation.

Figure 36:
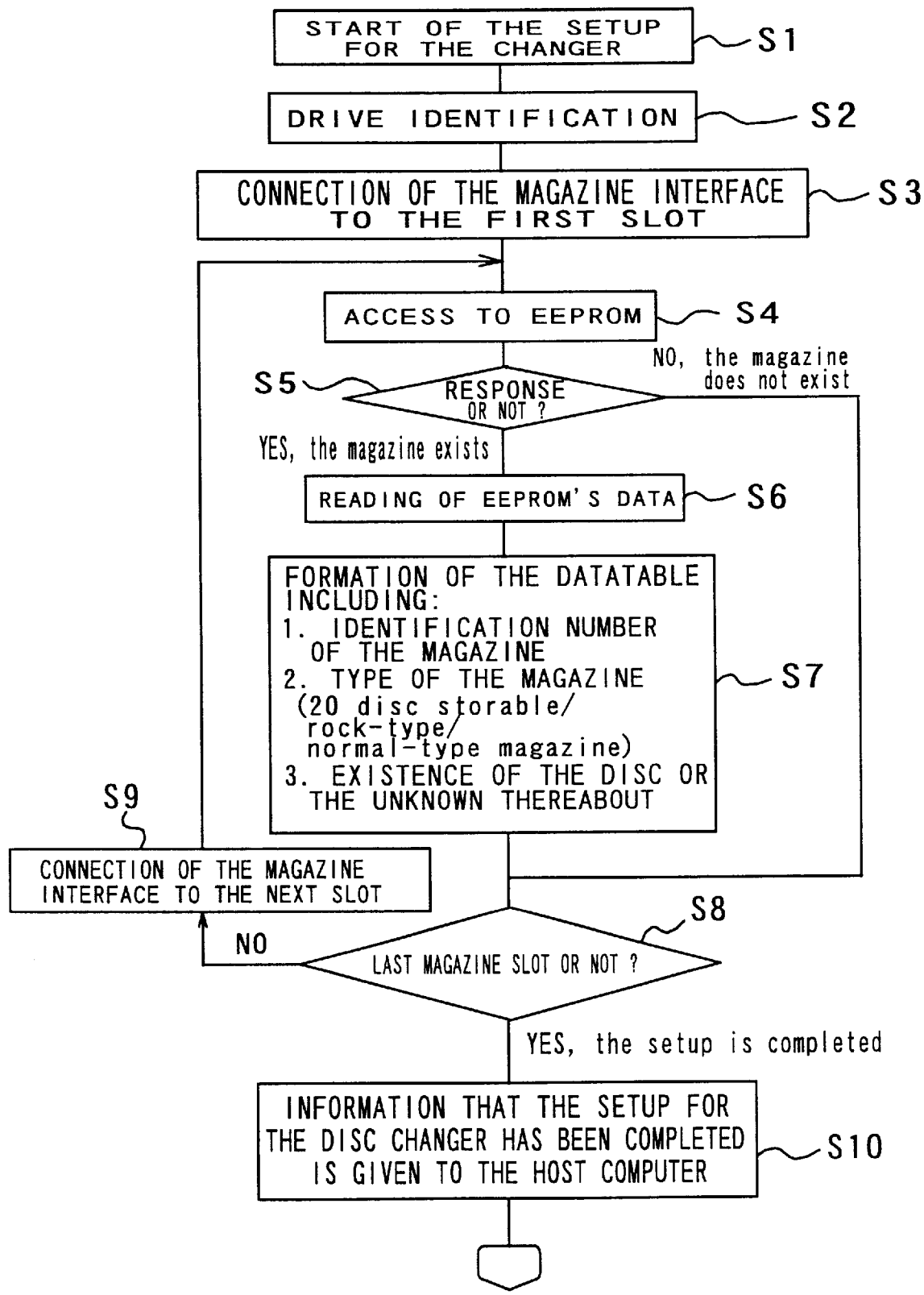
FIG. 36 is a flow chart illustrating procedures for setting up the changer.

Now, the setup for the changer will be described with reference to FIGS. 35 and 36.

The control unit 55 of the changer starts the setup for the changer in accordance with instructions from the operation unit 57 (Step S1).

Drive identification is carried out to identify the kinds of the disc driving devices 7 installed in the changer (Step S2). Then, the magazine interface is connected to the first slot of a plurality of slots 2, 3, 4 (Step S3).

Access to the memory 59 of the EEPROM is made (Step S4). A response to the access makes it possible to determine whether or not the stocker(s) 8 and/or 6 is loaded into the slot(s) 2, 3 and/or 4 (Step S5). When there is a response, i.e., the stocker(s) 8 and/or 6 is loaded into the slot(s) 2, 3 or 4, the reading step of the data from the memory 59 of the EEPROM is carried out (Step S6). On the basis of the above-mentioned data, there is formed a data table DT, which includes information on the identification numbers of the stockers 8, 6, on the type of the stockers 8, 6, on the existence of the disc 1 or the unknown thereabout in the respective disc rack 14 of the stockers 8, 6 and the like (Step S7).

All the above-described steps are carried out for each of the slots 2, 3 and 4. After the completion of formation of the data table for all the loaded stockers 8, 6 (Steps S8 and S9), information that the setup operation for the changer has been completed is given to the host computer 54 (Step S10) through the SCSI 58.

Figure 37:
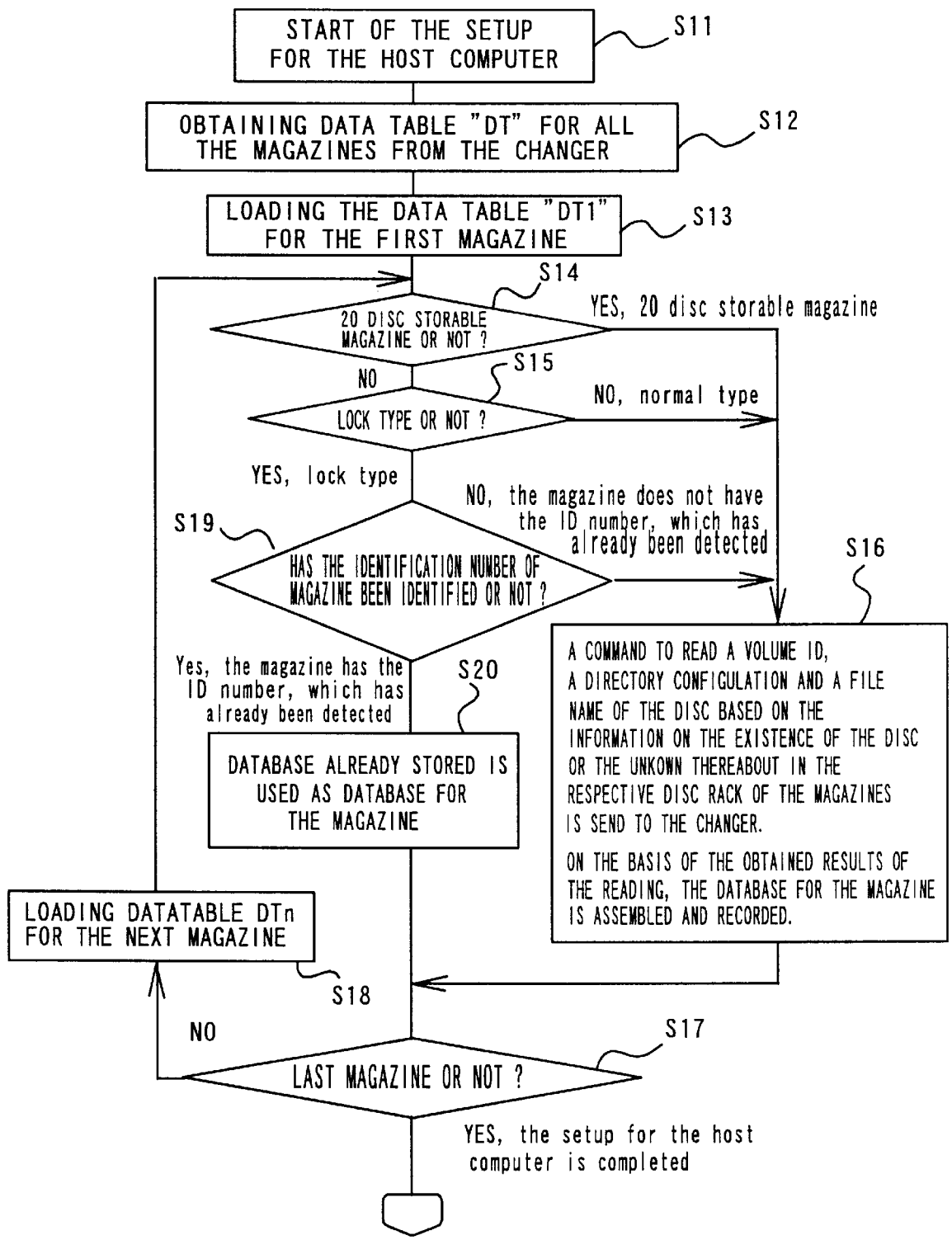
FIG. 37 is a flow chart illustrating procedures for setting up a host computer.

Now, the setup for the host computer will be described with reference to FIGS. 35 and 37.

When the host computer 54 receives the information from the changer that the setup operation for the changer has been completed, it starts the setup operation for the host computer 54 (Step S11).

First, there is obtained from the changer the data table for all the loaded stockers 8, 6, which has been formed by the setup operation for the changer (Step S12).

The type of the stockers 8, 6 is identified from the data table. There is given to the changer a command to read a volume ID, a directory configuration and a file name of the disc 1 on the basis of the information on the existence of the disc 1 or the unknown thereabout in the respective disc rack 14 of the stockers 8, 6. On the basis of the obtained results of the reading, the database for the stockers 8, 6 are assembled. The above-mentioned step for assembling the database is carried out for each of all the loaded stockers 8, 6, with the result that the database is assembled for all the discs 1 stored in the changer. The setup operation for the host computer is completed in this manner and accordingly the setup operation for the system for the changer is also completed (Steps S13, S14, S15, S16, S17, S18, S19 and S20).

When the stocker 6 is identified as the lock-type disc magazine (Step S15) in Steps S13 to S20, there is identified whether the identification number of the above-mentioned stocker has already been detected once or not (Step S19) in view of the fact that all the stockers have their individual identification numbers, which are not identical with each other. When the stocker has the identification number, which has already been detected, the data base for that stocker as stored in the memory of the host computer 54 is used (Step S20). It is therefore possible to omit the step for transferring the disc 1 stored in the stocker 6 to the disc driving device 7 to read the information recorded in the disc 1, thus remarkably reducing time required for the setup.

After the completion of the setup for the system for the changer and of assembly of the data base for all the stored discs 1 . . . 1, the disc driving device 7 starts to read the information recorded on the disc 1.

Description will be given below of the DVD-R driver exemplified as the disc driving device 7, which serves as an information recording and reproducing apparatus.

Figure 38:
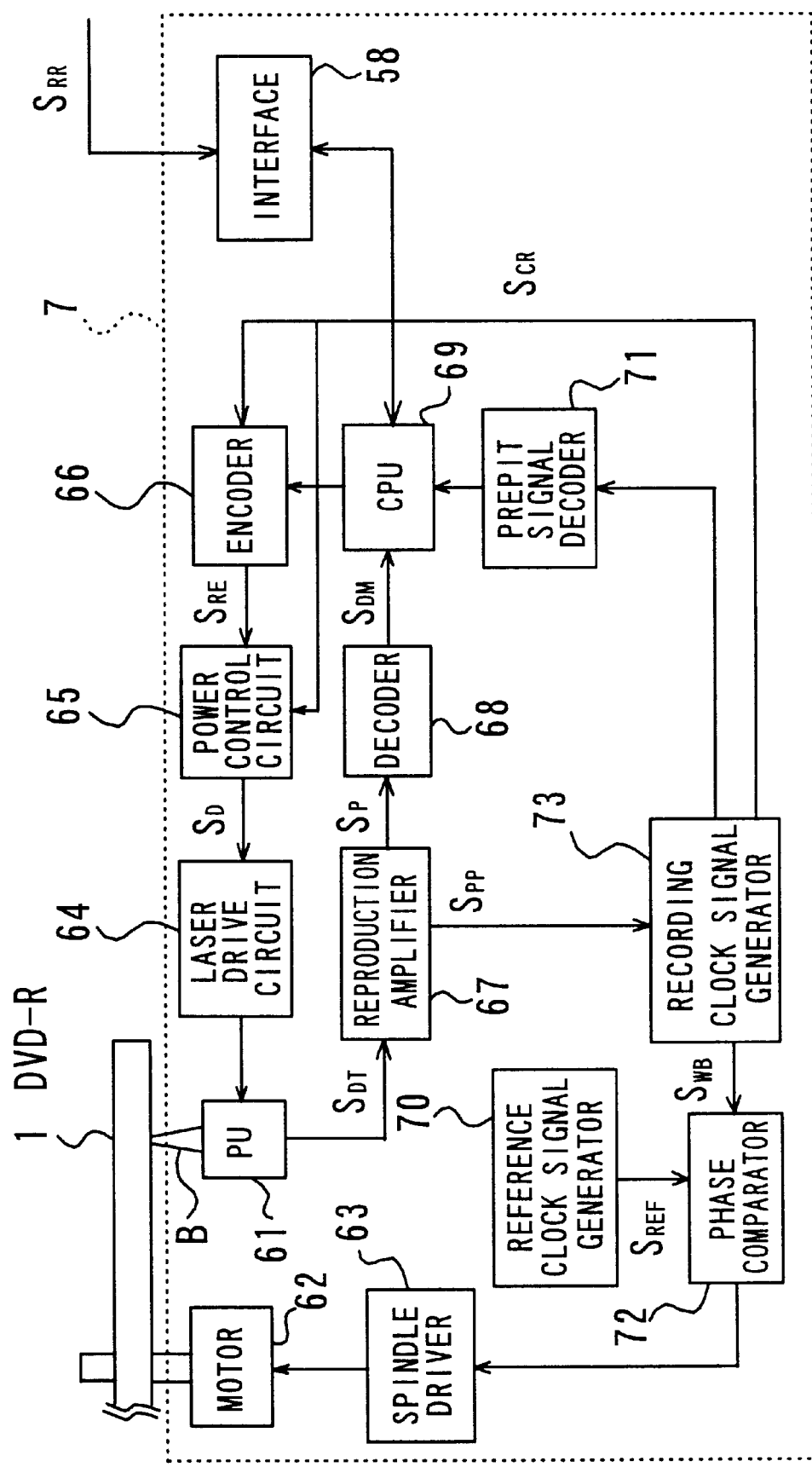
FIG. 38 is a block diagram illustrating a disc driving mechanism.

As shown in FIG. 38, the disc driving device 7 for the DVD-R disc 1 is composed of a pickup 61, a spindle motor 62, a spindle driver 63, a laser drive circuit 64, a power control circuit 65, an encoder 66, a reproduction amplifier 67, a decoder 68, a processor (CPU) 69, a reference clock signal generator 70 for generating a base clock signal for the rotation control, a prepit signal decoder 71, a phase comparator 72 for generating a rotation control signal, a recording clock signal generator 73 and an interface 58 for interchanging data such as the recording information, the reproducing information and the like relative to the external host computer 54. The recording clock signal generator 73 is in general composed of a PLL (phase lock loop).

The operation of the DVD-R driver will be described below.

The pickup 61 includes a laser diode, a polarizing beam splitter, an objective lens, a photo detector, which are not shown in the figures, and the like. The pickup 61 irradiates, in its recording operation, a light beam B onto the information recording surface of the DVD-R 1 by an irradiation power, which varies in accordance with a laser drive signal that is supplied from the laser drive circuit 64 on the basis of the recording information data, to make a record of the recorded information data. The pickup 61 also irradiates, in its reading operation, the light beam B onto the DVD-R 1 by a prescribed irradiation power (i.e., a leading power). The photo detector receives a reflected light of the above-mentioned light beam B.

The pickup 61 causes the photo detector to receive a reflected light from the information-recording surface of the DVD-R 1, onto which the light beam B is irradiated. The pickup 61 converts the reflected light thus received into an electric signal, and in other words, generates a detection signal $S_{DT}$, which includes the recording information data and the other information by carrying out for example an arithmetic processing based on a radial push-pull system and outputs the resultant detection signal $S_{DT}$ to the reproduction amplifier 67.

The reproduction amplifier 67 amplifies the detection signal $S_{DT}$, which has been output from the pickup 61, outputs a pre-information signal $S_{PP}$, which includes a prepit signal and a wobble signal, to the recording clock signal generator 73, and outputs, in its reading operation, an amplification signal $S_P$ corresponding to the information data, which has already been recorded, to the decoder 68.

The decoder 68 carries out an Eight-to-Sixteen demodulation processing and a deinterleaving processing relative to the input amplification signal $S_P$ to decode the amplification signal $S_P$ so as to generate a demodulation signal $S_{DM}$ and outputs the resultant demodulation signal $S_{DM}$ to the CPU 69.

The prepit signal decoder 71 decodes a pre-information, which includes an address information on the DVD-R 1 and outputs the resultant signal to the CPU 69.

The recording clock signal generator 73 outputs the recording clock signal $S_{CR}$ to the encoder 66 and the power control circuit 65.

The phase comparator 72 makes a phase comparison between the sampling wobble signal $S_{WB}$ input from the recording clock signal generator 73, on the one hand, and a reference clock signal $S_{REF}$, which is supplied from the reference clock signal generator 70 and includes a reference frequency component of the rotational velocity of the DVD-R 1, on the other hand, and supplies the resultant difference signal as the rotation control signal to the spindle motor 62 through the spindle driver 63. A spindle servo is constructed in this manner and the DVD-R 1 rotates in a prescribed number of rotations.

The interface 58 performs, under the control of the CPU 69, an interface operation for incorporating the recording information data $S_{RR}$, which is supplied from the host computer 54, into the information recording apparatus and supplied the above-mentioned recording information data $S_{RR}$ to the encoder 66. The interface 58 also has, in the reproduction operation, a function of supplying the recording information data of the disc 1 to the host computer 54.

The encoder 66 carries out an ECC (Error Correction Coding) processing, an Eight-to Sixteen demodulation processing and a scrambling processing, utilizing the recording clock signal $S_{CR}$ as a timing signal, generates a modulation signal $S_{RE}$ and outputs the resultant signal to the power control circuit 65.

The power control circuit 65 carries out the waveform shaping of the modulated signal $S_{RE}$ (so-called "light strategy processing") based on the recording clock signal $S_{CR}$ output from the clock signal generator 73 so as to enable the formation of appropriately shaped recording pits on the DVD-R 1, and outputs the resultant signal as the recording signal $S_D$ to the laser drive circuit 64.

The laser drive circuit 64 actually drives a laser diode (not shown) in the pickup 61 and outputs the laser drive signal for irradiating the light beam B by the irradiation power in accordance with the supplied recording signal $S_P$.

The CPU 69 obtains, in the recording operation, the address information from the pre-information, which is supplied from the prepit signal decoder 71, and controls the whole disc driving devices 7 so that the recording information data can be recorded on a position of the DVD-R 1, which corresponds to the above-mentioned address information. The CPU 69 obtains, in the reproduction operation, the recording information data recorded on the DVD-R 1 from the demodulation signal $S_{DM}$, and controls the whole disc driving devices 7 so that the thus obtained recording information data is output to the external host computer 54 through the interface 58.

According to the present invention as described in detail, it is possible to recognize whether or not at least one of information recording medium, which is actually stocked in the stocker, is pulled out of the stocker in an off-line condition or at least one new information recording medium is added to the stocker in the off-line condition, by means of a changer, a host computer or the like. Accordingly, it is enough to carry out a step for checking the information recording media and reassembling a data base in the stocker loaded in the changer, only when there is a possibility that the loading or unloading operation of the information recording media might be carried out. In the other cases, it is possible to start a system operation immediately after the load of the stocker. As a result, it is possible to reduce remarkably a period of time, which is required in order to start the system operation, thus achieving a rapid system setup.

What is claimed is:

1. A stocker for information recording media, which is capable of stocking the information recording media and is to be loaded in a changer or unloaded therefrom, which comprises:

a trace record device for providing a trace of lodging or dislodging operation of at least one information recording medium when said lodging or dislodging operation is carried out in an off-line condition, said trace record device being mechanical and comprising a movable member, said movable member being movable between a first, position exhibiting that said lodging or dislodging operation has not as yet been carried out and a second position exhibiting that said lodging or dislodging operation has already been carried out, wherein said trace record device is adapted to record said trace in interlocking relation with motion of a knob, which determines whether or not said at least one information recording medium is dislodgeable from said stocker.

2. The stocker as claimed in claim 1, wherein:

said trace record device has an arm member, which is adapted to move in interlocking relation with the motion of said knob, by which said at least one information recording medium is dislodgeable from said stocker, so as to record said trace.

3. A changer for information recording media, which comprises:

a stocker, which is to be loaded in the changer or unloaded therefrom, said stocker being capable of stocking the information recording media and said stocker heaving a trace record device for providing a trace of lodging or dislodging operation of at least one information recording medium when said lodging or dislodging operation is carried out in an off-line condition, said trace record device being mechanical and comprising a movable member, said movable member being movable between a first position exhibiting that said lodging or dislodging operation has not as yet been carried out and a second position exhibiting that said lodging or dislodging operation has already been carried out; and a detecting device for detecting said trace.

4. The changer as claimed in claim 3, wherein:

said trace record device is adapted to record said trace in interlocking relation with motion of a knob, which determines whether or not said at least one information recording medium is dislodgeable from said stocker.

5. The stocker as claimed in claim 4, wherein:

said trace record device has an arm member, which is adapted to move in interlocking relation with the motion of said knob, by which said at least one information recording medium is dislodgeable from said stocker, so as to record said trace; and said detecting device is adapted to detect a prescribed state in which said arm member is to be kept.

6. The changer as claimed in claim 3, further comprising:

a device for erasing said trace when said stocker is unloaded from said changer.

7. The changer as claimed in claim 3, further comprising:

a loading device for automatically transferring said stocker in an unloading direction in accordance with instructions for unloading said stocker from said changer.

* * * * *